United States Patent [19]
Ando et al.

[11] Patent Number: 5,206,195
[45] Date of Patent: Apr. 27, 1993

[54] STABLIZED SYNTHETIC ZEOLITE AND A PROCESS FOR THE PREPARATION THEREOF

[75] Inventors: Satoshi Ando; Kazuhiko Nakajima; Akira Dohno, all of Osaka, Japan

[73] Assignee: Kanebo Ltd., Tokyo, Japan

[21] Appl. No.: 706,948

[22] Filed: May 29, 1991

[30] Foreign Application Priority Data

| May 31, 1990 | [JP] | Japan | 2-140094 |
| Aug. 30, 1990 | [JP] | Japan | 2-226619 |
| Oct. 30, 1990 | [JP] | Japan | 2-290947 |
| Nov. 2, 1990 | [JP] | Japan | 2-297841 |
| Nov. 30, 1990 | [JP] | Japan | 2-334618 |
| Feb. 1, 1991 | [JP] | Japan | 3-033507 |

[51] Int. Cl.$^5$ .................. B01J 20/18; C01B 33/34
[52] U.S. Cl. ..................... 502/64; 502/60; 502/62; 423/118; 423/713
[58] Field of Search ............ 502/60, 62, 64; 423/118, 328

[56] References Cited

U.S. PATENT DOCUMENTS

| 3,130,006 | 4/1964 | Rabo et al. | 502/60 |
| 3,740,347 | 6/1973 | Rosen et al. | 502/60 |
| 4,623,631 | 11/1986 | Kostinko | 502/60 |
| 4,987,109 | 1/1991 | Kao et al. | 502/60 |

*Primary Examiner*—Carl F. Dees
*Attorney, Agent, or Firm*—Kane, Dalsimer, Sullivan, Kurucz, Levy, Eisele and Richard

[57] ABSTRACT

Synthetic zeolite is stabilized to water by soaking it in a buffered acid solution for a prolonged time. The stabilized synthetic zeolite does not exhibit alkalinity when it is dispersed in water at room temperature for 24 hours or more, and exhibits improved flowability and almost constant ratios among Na, Al and O along the depth direction from the surface of the zeolite particles.

19 Claims, 2 Drawing Sheets

STABLIZED SYNTHETIC ZEOLITE AND A PROCESS FOR THE PREPARATION THEREOF

FIELD OF THE INVENTION

This invention relates to stabilized fluid synthetic zeolite which does not show auto-decomposition in water and shows good flowability and a process for the preparation thereof.

PRIOR ART

Zeolite has its specific micropore diameter, surface electric field, ion exchange ability and adsorption-isolation ability, and is drawing attention as a very useful functional material. Particularly, synthetic zeolite has been used in various fields because it may be produced with uniform quality, which is characteristic of a synthetic material, in a large amount and are available constantly.

Synthetic zeolite is usually prepared by mixing solutions of sodium silicate, sodium aluminate and sodium hydroxide, ripening the mixture, and filtering the resultant gel, followed by washing with water and drying.

Zeolite may also support other metal ions through ion exchange. Such zeolite with specific metal ions has functions attributable to the metal ions as well as functions intrinsic to zeolite. For instance, French Patent 1,061,158, U.S. Pat. Nos. 4,775,585; 4,911,898; and 4,911,899 disclose antibacterial compositions containing zeolite which is ion-exchanged with antibacterial ion such as copper, zinc or silver. Transitional metals such as nickel may be supported on zeolite to give catalytic activity to it.

Synthetic zeolite previously available on market is washed with water in a later step of a production process. Nevertheless, when it is dispersed in water, the dispertion shows strong alkalinity. Synthetic zeolite is used in a large amount in detergents, where the alkalinity of Synthetic zeolite is rather advantageous. Synthetic zeolite is also used in adsorbents, catalysts, carriers, ion exchangers and fillers. In some of these fields, the alkalinity of synthetic zeolite is a drawback.

As will be shown in the following Example, some of synthetic zeolite prepared by Japanese and foreign manufacturers and the present inventors have now been examined, where synthetic zeolite dispersions of a concentration of 50 g/liter were maintained at a temperature of 20° to 25° C. for 24 hours. Then, their pH's were about 10 or higher. The existence of aluminium was observed at about 7 to 30 ppm in the dispersions. Even when synthetic zeolite was freshly washed with a large amount of water before examined, the dispersions were still found to show strong alkalinity. Alternatively, synthetic zeolite was neutralized with dilute acid, separated, washed with water, and then dispersed in water as aforesaid. The dispersions were alkaline as well. All of the examined synthetic zeolite showed strong alkalinity and elution of aluminium. A drop (0.03 ml) of a normal hydrochloric acid solution was added to 100 ml of a dispersion of certain synthetic zeolite of a concentration of 50 g/liter which would otherwise show a pH of 11 after allowed to stand for 24 hours, the pH after 24 hours was about 11. That is, the pH was the same as that of the case where hydrochloric acid was not dropped. Separately, a drop (0.03 ml) of a normal sodium hydroxide solution was added to a zeolite dispersion similar as aforesaid, the pH after 24 hours was again 11.

Meanwhile, a dispersion of a certain type of natural zeolite in water showed a pH of 6.8 and the concentration of aluminium was less than the detection limit (0.5 ppm). When normal hydrochloric acid was dropped to the same zeolite dispersion, the pH became 5.0 immediately and did not change even after 24 hours. On the other hand, when normal sodium hydroxide was dropped to the same zeolite dispersion, the pH became 9.0 immediately and did not change even after 24 hours.

As seen above, previous synthetic zeolite shows remarkable alkalinity unlike natural zeolite and, even after washed with water or neutralized in a conventional manner, still exhibits remarkable alkalinity. It is believed that this is due to a phenomenon that synthetic zeolite disintegrates gradually of itself or alkaline substances which were confined in synthetic zeolite during production exudes gradually from zeolite. In natural zeolite, unstable structure of zeolite or alkaline substances may be removed, for instance, by being washed with rain in a vast period of time.

Synthetic zeolite available on market also has a problem in flowability. All of the previous synthetic zeolite tested by the present inventors show an angle of response in a range of 45 to 60 degrees. For instance, zeolite Y produced by an American company G shows an angle of response of 52 to 54 degrees and zeolite X produced by the same company, 50 to 52 degrees. These values are classified as "less good" or "bad" according to Carr's method, R. A. Carr, Chem. Eng. vol. 72(1965), 2, p 163, and 2, p 69. Such low flowability may cause problems, for instance, in transportation, feeding to equipment, stirring and filling.

SUMMARY OF THE INVENTION

An object of the invention is to remove the unstability of synthetic zeolite to water and humidity in air and to provide synthetic zeolite whose dispersion in water does not exhibits alkalinity.

Another object of the invention is to provide stable synthetic zeolite which shows good flowability.

Another object of the invention is to provide a process for the preparation of such synthetic zeolite.

The present inventors have now found that the envisaged stable and fluid zeolite is obtained by a process where synthetic zeolite is soaked in a buffered acid aqueous liquid; buffered or non-buffered acid is replenished, if needed, to maintain the pH of the soaking liquid at a predetermined value of about 7 or less and the soaking is continued until the pH remains approximately constant for at least 0.5 hour without replenishing the acid; and then the synthetic zeolite is heat-dried without being washed or after washed in conditions that the pH of a washing liquid does not substantially exceed about 6.5.

The synthetic zeolite according to the invention is characterized in that the pH of dispersion water of the synthetic zeolite dispersion is in a range of from 5 to 7, preferably 6.0 to 6.8, where synthetic zeolite is dispersed in distilled water at a concentration of 50 g/liter and maintained at a temperature of 20° to 25° C. for 24 hours, preferably 72 hours, and that the synthetic zeolite shows an angle of response of 40 degrees or less, preferably 30 degrees or less.

The synthetic zeolite of the invention is also characterized in that it has almost constant ratios among Na, Al and O along the direction from the surface to the center of the zeolite particle.

In modification of the process of the invention, a gel-forming substance is added to the soaking liquid. The synthetic zeolite thus obtained is synthetic zeolite whose surface is covered with semipermeable gel.

It has now been found that the synthetic zeolite thus soaked in a buffered acid aqueous liquid may be ion-exchanged with metal ions with some other advantages. That is, the ion-exchanged product has better whiteness and shows less discoloration in a weathering test. The synthetic zeolite thus soaked may be ion-exchanged in a new manner with such a small amount of a metal ion solution that it is absorbed to exhaustion.

In addition, it has also been found that the higher whiteness may be attained with synthetic zeolite which is subjected to simpler soaking or washing in an acid liquid. That is, the invention provides a method of ion-exchanging synthetic zeolite with metal ions, characterized in that the synthetic zeolite is washed with an acid aqueous liquid prior to the ion-exchange.

The washed zeolite may be ion-exchanged with such a small amount of a metal ion solution that is absorbed substantially to exhaustion.

DETAILED DESCRIPTION OF THE INVENTION

Figure 1A:
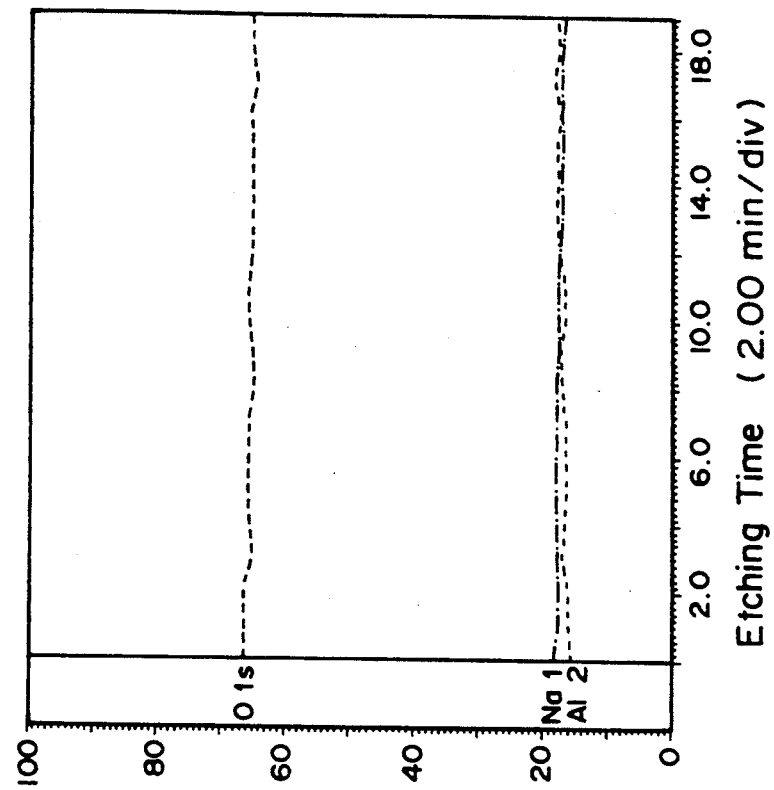
FIGS. 1a and 1b are depth analysis graphs with ESCA on zeolite particles processed with a buffered organic acid aqueous liquid according to the invention.

The first requisite of the process of the invention is that the soaking is continued until a soaking liquid remains approximately constant at pH 7 or less, for a long time even without addition of acid and, then, synthetic zeolite is heat-dried without being washed or, if washing is conducted, after washed in conditions that the pH of a washing liquid does not exceed 6.5 for a substantively long time. Mere washing with water or mere neutralization as previous cannot attain the purpose of the invention as a matter of course. Further, the purpose of the invention cannot be attained if heat drying is conducted after the pH of a washing liquid exceeds 6.5 or, particularly, becomes neutral due to washing with a large amount of water even though the soaking is carried out beforehand. In contrast, once heat drying is carried out after the soaking without washing or with washing in conditions that the pH of a washing liquid does not substantially exceed 6.5, a dispersion of the synthetic zeolite does not show alkalinity even if the synthetic zeolite is washed with water later. This was not expected at all.

The second requisite of the process of the invention is that an acid aqueous liquid is buffered. When acid is added or replenished to a zeolite dispersion, the pH of the soaking liquid will decrease locally if stirring is insufficient and, as a result, the zeolite will be rapidly attacked in part. For instance, zeolite A is rapidly damaged at pH 4 or below. In contrast, in the invention where the soaking liquid is buffered, local drop of the pH of the soaking liquid is smaller and, therefore, rapid decomposition of zeolite does not take place. Accordingly, zeolite can be modified in a prolonged acid treatment without causing damage on zeolite particles. Further, the dispersion does not become viscous or foam due to decomposition of zeolite and, therefore, operations such as stirring will not become difficult. In addition, added acid is not consumed in decomposition of zeolite. Accordingly, the amount of acid used may be decreased advantageously.

Synthetic zeolite used in the invention includes all types of synthetic zeolite. Synthetic zeolite is generally represented by the formula, $xM_{2/n}O \cdot Al_2O_3 \cdot ySiO_2 \cdot zH_2O$, taking $Al_2O_3$ as a standard, wherein M is monovalent or divalent metal, particularly alkali metal such as sodium and potassium, n is its valency, and x, y and z are chemical factors of metal oxide and silicon dioxide and the number of crystal water, respectively. Many types of synthetic zeolite are known which have different compositions, micropore diameters, specific surface areas and so on. Examples of typical synthetic zeolite include zeolite A ($SiO_2/Al_2O_3$=1.4 to 2.4), zeolite X ($SiO_2/Al_2O_3$=2 to 3), zeolite Y ($SiO_2/Al_2O_3$=3 to 6) and mordenite ($SiO_2/Al_2O_3$=9 to 10).

M in the above formula is generally sodium or potassium, but a part or the whole of M may be replaced with heavy metal such as iron, zinc, copper, tin, silver, vanadium, wolfram, nickel, molybdenum, antimony and chromium, light metal such as calcium, magnesium, lithium and aluminum, or ammonium ion.

The acid aqueous liquid used to soak synthetic zeolite is a buffered aqueous solution of inorganic acid and/or organic acid. There is no particular limitation on the acid or buffer, and any known ones may be used. For instance, inorganic acid such as hydrochloric acid, hydrobromic acid, sulfuric acid, nitric acid and phosphoric acid, and mono-valent or di-valent organic acid such as formic acid, acetic acid, oxalic acid and tartaric acid may be used.

Any buffer which gives buffering action to an acid aqueous liquid may be used. Typically, combinations of various weak acids with their salts may be used, such as acetic acid with sodium acetate, potassium acetate or ammonium acetate; oxalic acid with sodium oxalate, potassium oxalate or ammonium oxalate; tartaric acid with sodium tartrate, potassium tartrate or ammonium tartrate; and phosphoric acid with sodium phosphate, potassium phosphate or ammonium phosphate. Use may be made of lactic acid with sodium, potassium or ammonium lactate. Besides, salts of weak acids include acetate of calcium, magnesium, strontium, manganese, cobalt, nickel and copper. Calcium, magnesium or transitional metal ions may be ion-exchanged at the same time with the soaking. Two or more acids and/or buffers may be used in mixture. It is also possible to solely use a salt of weak acid as a buffer without combining it with a corresponding weak acid. For instance, when strong acid such as nitric acid is used for soaking, a part of an added salt of weak acid reacts with the strong acid to form the corresponding weak acid and, as a result, an acid aqueous liquid is buffered. When weak acid is used for soaking, a buffered system is attained by adding a salt of this weak acid. Alternatively, because an aqueous dispersion of synthetic zeolite exhibits strong alkalinity as mentioned above, a buffer system can be formed in situ by adding acid to it. However, a little long period of time is needed for strong alkalinity to be established. Accordingly, addition of acid to a dispersion is preferably carried out about 10 minutes or more, preparably about 30 minutes or more, after dispersing the zeolite. This embodiment is particularly effective for zeolite A. In the invention, use is preferably made of a combination of weak acid, such as acetic acid, formic acid, oxalic acid, tartaric acid, adipic acid or boric acid, with its salt, though any known acid and buffer may be used. It is believed that attack on zeolite is prevented with the use of the buffered soaking liquid in the invention and this effect is further emphasized with the use of weak acid.

The solvent is generally water. Small amounts of organic solvents and/or surfactants may be contained.

The initial pH of the soaking liquid is set to 7 or less, preferably 4.0 to 6.5, more preferably 4.5 to 6.0. With the progress of the soaking treatment, the pH will rise. Accordingly, the pH is adjusted with buffered or non-buffered acid (solution).

The soaking may be conducted in any manner. For instance, an acid aqueous liquid which contains a buffer and optional substances such as a gel-forming substance is placed in a vessel provided with a stirrer, to which synthetic zeolite is added little by little under stirring. During this process, the pH of the dispersion liquid goes up. Then, acid is added properly to maintain the pH at a predetermined value of 7 or less. Here, the acid (solution) may also contains a buffer and/or a gel-forming substance. Even after all zeolite is dispersed, acid is added to maintain a predetermined pH under continued stirring. The soaking is ended after it is confirmed that the pH remains almost constant (plus/minus 0.5, preferably plus/minus 0.3) without further addition of acid. In general, the soaking is continued for additional 0.5 hour or more, preferably additional 2 hours or more, after the pH becomes almost constant without addition of acid. Stability of the product zeolite becomes better with prolonged treatment after approximately constant pH is attained. There is no particular limitation on a soaking temperature. However, comparatively high temperature, such as 50° C. or higher, of a dispersion liquid is preferred for improved flowability of zeolite particles and constant composition of sodium and so on along the depth direction of zeolite particles. To illustrate preferred treatment conditions, the treatment is conducted under moderate stirring of 100 to 2,000 rpm at a final synthetic zeolite solid particle concentration of 5 to 100% by weight. The treatment time may be shortened with an extremely low concentration of synthetic zeolite and an elevated temperature. Stirring speed affects the treatment time only a little.

In contrast with the above, zeolite may first be dispersed in water or a buffer solution, to which acid which may or may not contain a buffer and/or a gel-forming substance is added little by little to perform soaking. Treatment pH and time period may be the same as stated above.

Alternatively, the soaking of synthetic zeolite may be performed as a final step of the preparation of synthetic zeolite. That is, the aforesaid soaking may be carried out by separating a slurry after reaction which contains zeolite gel formed from an aqueous solution of sodium silicate, sodium aluminate and sodium hydroxide and adding acid to the produced zeolite. Preferably, zeolite is separated from the slurry and washed with water as in a conventional process and, thereafter, a slurry of the zeolite is added to buffered acid water to perform the soaking.

What is important in the soaking with acid is that the soaking is not ended in a short period of time as in usual neutralization, but is continued until the pH of the liquid remains almost constant for at least 0.5 hour, preferably at least 2 hours, without further addition of acid. Depending upon types and preparation methods of synthetic zeolite, it is sometimes impossible to maintain the pH constant at a predetermined value for a predetermined time. In such a case, a pH value at which a constant pH is attained without addition of acid may be found by conducting the soaking with aimed pH values being changed (generally speaking, on the more acid side).

After synthetic zeolite is soaked in the buffered acid aqueous liquid for a sufficient period of time as described above, the synthetic zeolite is generally separated from the liquid, which may be performed in any manner such as filtration or decantation.

The separated zeolite is subjected to heat drying without being washed. Alternatively, it may be washed on conditions that the pH of a washing liquid does not substantially exceed 6.5. With the terms "does not substantially exceed 6.5" used herein, it is meant that the pH of a washing liquid at the end of washing is 6.5 or less. Even if the pH of a washing liquid exceeds 6.5 for a short time, it is possible to obtain the synthetic zeolite aimed in the invention. Acid aqueous liquids may be used in washing operation. For the acid, any acid capable of being used in the soaking may be adopted. The pH of the acid aqueous liquid is preferably similar to or less than that of the soaking, but may be higher than that. It is also possible to conduct washing with a small amount of water. A considerable amount of acid used in the soaking remains on zeolite, depending upon a pH in the soaking and a manner of separation from a soaking liquid, for instance, in a case where the soaking is carried out at a lower pH or separation of zeolite from a soaking liquid is carried out by decantation. Then, the pH of a washing liquid is 6.5 or less at the end of washing with a relatively small amount of water. Thus the purpose of the invention can be attained. Washing operation itself may be carried out in various conventional manner. For instance, separated synthetic zeolite is placed in a vessel provided with a stirrer, to which a washing liquid is added, followed by stirring to wash. Alternatively, a washing liquid is poured to zeolite in a separation instrument. Washing is conducted usually with a washing liquid of an amount 0.5 to 100 times as much as the zeolite at room temperature, but other conditions are also allowed. In such washing operation, the quality of the product is improved, for instance, by removal of impurities formed from zeolite during the soaking.

Next, the synthetic zeolite obtained is heat dried, which is usually carried out at a temperature of 100° C. or higher, preferably 120° C., or higher, more preferably 130° C. or higher and below 200° C., for at least 1 hour, preferably at least 3 hours, at atmospheric pressure or, optionally, reduced pressure. Accompanying acid vaporizes usually during such heat drying. Accordingly, it is apparent that accompanying acid is not a reason why synthetic zeolite of the invention does not exhibit strong alkalinity when dispersed in water. The effects of the invention are attained only when the heat drying is carried out without washing or with the defined washing after the soaking according to the invention. The purpose is not attained if synthetic zeolite is washed with a large amount of water after the soaking and then heat-dried. Meanwhile, even if synthetic zeolite finished according to the invention is later washed with a large amount of water, the effects of the invention are not lost.

The aforesaid series of operations comprising soaking, optional washing, and heat drying may be repeated plural times.

As described above, the synthetic zeolite of the invention is very stable in water. After the synthetic zeolite of the invention is dispersed in distilled water at a concentration of 50 g/liter and maintained at a temperature of 20° to 25° C. for 24 hours, preferably 72 hours, the pH of the dispersion water remains in a range of from 5 to 7, preferably 6.0 to 6.8. The stability of the synthetic zeolite of the invention is also confirmed by a fact that no aluminium ion is detected in the dispersion water, as will be explained in the following Examples. With conventional synthetic zeolite, the pH of dispersion water shows strong alkalinity and aluminium ion is detected after 24 hours.

Metal ion may be added to the buffered acid aqueous liquid to thereby perform ion exchange at the same time with the stabilization of zeolite. Alternatively, ion-exchange may be performed between the soaking and the heat drying. It is also possible to subject the product zeolite of the invention to ion-exchange. Metal ion is not particularly limited and any ion-exchangeable metal ion may be used, such as iron, zinc, copper, tin, silver, vanadium, wolfram, nickel, barium, molybdenum, antimony, chromium, calcium, magnesium, manganese, lithium, aluminium, titanium, gallium and germanium. Accordingly, metal ion to be supported by zeolite may be selected to fit to application envisaged. To illustrate the preparation of antibacterial zeolite as an instance, antibacterial metal ions, preferably silver, copper and zinc, are used.

Flowability of zeolite particles is improved by the process of the invention. The synthetic zeolite of the invention exhibits high flowability shown by an angle of response of 40 degrees or less, preferably 30 degrees or less, determined in a filling method. The angle of response herein is determined as follows: A funnel is fixed above the center of a circular table of 50 mm in diameter. The inner diameter of a hole of the funnel is 3 mm and the distance from the lower end of the funnel to the table is 100 mm. Sample zeolite particles are placed in the funnel and allowed to flow down through the hole of the funnel until the particles fall down from the edge of the table, so that a circular cone of zeolite particles is formed on the table. An angle of response is defined as an angle of the line connecting the top of the circular cone and the edge of the table between the horizon. In practice, the height of the circular cone is measured, from which an angle of response is calculated.

In addition, the zeolite modified by the above process of the invention exhibits almost constant ratios among sodium, alminium and oxygen atoms along the depth direction from the particle surface. The ratios may be determined by ESCA. For instance, depth analysis is carried out by alternatively conducting ESCA measurement and etching on the surface of zeolite particles and obtaining relative amounts of sodium, alminium and oxygen (total 100). The values are plotted against etching time. Thus, change of the composition with depth can be seen on a graph. Some results obtained this way will be shown in the following Examples.

The invention shall not be limited by any particular theory, but it is believed that a sol substance covers the surface of synthetic zeolite in the soaking treatment according to the invention. That is, silicon and alumininium atomic groups (ionic groups) which are released via destruction from defects of zeolite crystal structure or raw materials of zeolite which are confined in zeolite react with the acid to form a sol substance on the surface of zeolite. In a case where a gel-forming substance is added, it attaches to the zeolite surface or reacts with the acid, so that a sol substance is formed on the zeolite surface. When synthetic zeolite is then heat-dried, the sol substance is thought to dehydrate and become a xerogel. Once a xerogel layer is formed, this does not fall off even in washing with water. Meanwhile, a sol substance before heat-dried is delicate and will fall off in washing with water in a neutral or alkaline atmosphere. When the synthetic zeolite of the invention is dispersed in water, the xerogel layer is believed to act as a so-called semipermeable layer to prevent aluminium and silicon atomic groups from going out from zeolite into water.

The above is thought also to explain why the zeolite of the invention exhibits the high flowability and the almost constant composition ratios among sodium, aluminium and oxygen along the depth direction from the particle surface. While the surface of previous synthetic zeolite particle is very rough and its edges are sharp; in the process of the invention the unevenness on the surface is smoothened, the edges are made dull and the surface is covered with a gel substance. Accordingly, the friction resistance is decreased. The composition ratios of sodium, etc., along the depth direction of zeolite particles becomes almost constant because impurities are removed off and, further, the surface of zeolite particles is covered with a sol substance. If zeolite particles are soaked in an acid liquid which is not buffered, a liquid pH changes locally at the event of replenishing an acid as mentioned above, so that zeolite particles are eroded unevenly and rapidly. Thus, improvement on flowability of zeolite is small.

It should be noted that Japanese Patent Application Laid-Open No. 203723/1984 discloses modified zeolite, wherein mineral components in sea water are supported on zeolite and its equilibrium pH is adjusted to 10.5 or less. The equilibrium pH is preferably 9.5 to 4.5, and one having an equilibrium pH of 6.5 is described in a working example. However, the equilibrium pH referred to therein is a pH value of an aqueous slurry of 5 g/100 ml only 30 minutes after it is prepared. The present inventors have found that equilibrium pH cannot be reached in 30 minutes. For instance, when conventional synthetic zeolite is neutralized with a hydrochloric acid solution of a pH of 2.5 and dispersed in water, the pH of the dispersion water is 6.5 after one hour, but remarkably increases up to 8.9 after 24 hours. Accordingly, the zeolite of "equilibrium pH" mentioned in the above patent application does not suggest the present invention. Further, the treatment of zeolite with acid therein is simply referred to as "neutralization treatment", and therefore, does not suggest the prolonged treatment of the invention. When conventional synthetic zeolite is neutralized with acid, it is outwardly neutralized quickly. However, even if it is next dried without washing, its dispersion in water exhibits strong alkalinity, again.

It should also be noted that Japanese Patent Publication 12576/1991 discloses an additive for a resin, which comprises spherical zeolite A of 5 μm or amorphous particles obtained by acid-treatment of such zeolite, and 0.2 to 5 wt. % of amorphous silica. In this publication, no buffer is used in acid treatment of zeolite particles and a dispersion liquid of a very low pH (strong acid) is used. The amorphous particles obtained have no ion-exchange ability. It does not describe or suggest that acid treatment should be continued until a pH of a dispersion liquid remains constant for a long period of time. It does not describe, either, that water washing should be avoided or is allowed only to such an extent that a pH of a washing liquid does not exceed 6.5. The present inventors repeated the only one embodiment disclosed there, in which water washing was however avoided according to the present invention. The pH of the obtained zeolite was so high as 8.5, compared to a pH of 5–7 in the invention.

Another Japanese Patent Publication, 25451/1991, discloses an alumina-silica additive for a resin, which comprise an amorphous alumina-silica having a particular size distribution, surface area and some other properties. Such an amorphous alumina-silica is obtained by acid-treating synthetic zeolite of 0.6 $\mu$ or less and an $Al_2O_3/SiO_2$ mole ratio of 1:1.8 to 1:5.0. An acid liquid is buffered, which is in common with the present invention. However, acid-treated zeolite is definitely washed with water and then dried at 300° C. or high to obtain amorphous alumina-silica. In only one Example which demonstrates the acid treatment, the pH of a slurry of the obtained amorphous alumina-silica is so high as 8.5. Thus, it is not stabilized, which is apparently different from the present invention.

In an embodiment of the process of the invention, a gel-forming substance is added to the buffered acid aqueous liquid to thereby constructively add semipermeable gel of foreign origin on the synthetic zeolite surface.

Preferred examples of gel-forming inorganic substances used here include aluminosilicate, silicic acid, silicate, aluminate and alumina. More specially, silicic acid, various silicates such as calcium silicate, magnesium silicate, aluminium silicate, potassium silicate, sodium silicate and water glass, aluminate such as sodium aluminate, calcium aluminate and magnesium aluminate, aluminosilicate such as zeolite, feldspar and mica, and alumina may be named. In the cases of hardly-soluble substances such as zeolite and alumina, these are dissolved by heating in strong acid or strong alkali, and the resultant easily-soluble materials are used. For instance, zeolite is dissolved in concentrated nitric acid and used. Zeolite is soluble in acid of a pH of 2 or less. For alumino-silicate, this is preferably obtained by dissolving zeolite of the same type as zeolite to be treated. Natural silicon compounds such as silica powder, quartz sand, diatomaceous earth and colloidal silica, and other aluminium containing compounds may also be used. Any known inorganic gel-forming substances may be used.

Preferred examples of gel-forming organic substances include natural semipermeable high molecular weight substances such as gelatin, agar, sodium allginate and various cellulose derivaties, and semipermeable synthetic polymers such as PVA derivatives, regenerated cellulose derivatives, acrylic acid derivatives, melamine resin derivatives and phenol resin derivatives.

The aforesaid gel-forming substances effective in the invention may be used alone or in combination with each other.

It is possible to combine small amounts of inorganic polyvalent salts such as calcium nitrate and magnesium nitrate, and organic acid salts such as sodium oxalate and sodium potassium tartrate to thereby obtain more stable synthetic zeolite particles.

In general, these gel-forming substances exist in an amount of 0,001 to 10% by weight, preferably 0,01 to 1% by weight, based on the whole weight of zeolite.

Stability of the zeolite obtained is further improved by adding the gel-forming substance. However, in this embodiment, it little improves flowability of zeolite particles and uniformity of the composition along the direction of depth.

The synthetic zeolite of the invention stably holds a neutral or very weakly acid property. Even when it is wetted, its pH does not rise, but remains stable. Accordingly, it shows low stimulation on contacting mucosae or skins and exhibits no adverse effects. Thus, it may be used as a raw material or gredient in medicines, medical instruments, cosmetics and foods. When it is mixed or incorporated in various organic or inorganic materials, its structure is stable for a long period of time and, accordingly, does not cause deterioration of physical properties or characteristics of the materials.

A dispersion of the synthetic zeolite of the invention shows the same pH, e.g. 6.8, dispersed either in aqueous acid (hydrochloride, pH 2 to 3) or in aqueous alkali (sodium hydroxide, pH 10 to 11) at a solid/liquid ratio of 1/10. Further, the synthetic zeolite does not collapse and no aluminium ion is detected. Accordingly, it may be used as a pH regulator, for instance, to neutralize acid rain or to adjust water in culture ponds or ocean.

The synthetic zeolite of the invention is highly flowable and easy to handle. This is advantageous also in conventional applications of zeolite. The present invention may be applied to all of the conventional types of synthetic zeolite which are modified by ion-exchange for particular usage. The synthetic zeolite of the invention mostly have substantially the same functions as those of conventional synthetic zeolite, and may be used as desiccating agents, adsorbents, ion exchanger, various additives, catalysts, separators such as molecular sieves, pellets for water treatment or carriers.

It is known that metal ions are supported on zeolite via ion exchange to give zeolite having properties of the metal ions (U.S. Pat. No. 4,775,585). Ion exchange is performed by soaking zeolite in an aqueous solution of metal ions, where it may happen that impurities contained in zeolite, such as alkaline components, react with the metal ions to deposit metal compound on the zeolite surface so that the functions of the ion-exchanged zeolite may be damaged. For instance, when silver ion is ion-exchanged on synthetic zeolite, silver ion may reacts with alkaline components, which used to be contained in zeolite, to form deposition such as silver oxide, so that whiteness, discoloration resistance in weathering, adsorption ability and bacteriocidal property may deteriorate. The synthetic zeolite of the invention does not show elution of impurities such as alkaline components and, accordingly, no deposition occurs and no deterioration of functions take place. In addition, the composition is almost constant along the depth direction from the surface of the zeolite of the invention, so that metal ions may be ion-exchanged more uniformly.

The synthetic zeolite of the invention maintains its functions when pelletized by various pelletizers. Use of the synthetic zeolite of the invention by mixing it in organic polymers will be specifically explained below. It is known that antibacterial metal ions are supported on zeolite, and polymers are mixed with the zeolite and shaped (U.S. Pat. No. 4,775,585). As the synthetic zeolite of the invention is neutral or very weakly acid, it does not cause degradation of polymers. Polymers used herein are, for instance, synthetic or semisynthetic organic polymers, more specifically, thermoplastic synthetic polymers such as polyethylene, polypropylene, polystyrene, polyvinyliden chloride, polyamide, polyester, polyvinyl alcohol, polycarbonate, polyacetal, ABS resins, acrylic resins, fluororesins, polyurethane elastomers and polyester elastomers, thermosetting synthetic polymers such as phenol resins, urea resins, melamine resins, unsaturated polyester resins, epoxy resins and urethane resins, and regenerated or semisynthetic polymers such as rayon, cupra, acetate and triacetate. By incorporating the synthetic zeolite into polymers, it is possible to obtain shaped polymer articles, including coating and adhesives, which has functions of (modified) zeolite such as adsorption, drying and antibacterial properties. Further, the synthetic zeolite of the invention may be used as additives in industrial materials which require pH stability, such as paints and adhesives. Difference between the synthetic zeolite of the invention and conventional synthetic zeolite previously used is particularily remarkable in shaped polymer articles which contain at least 0.01% by weight of synthetic zeolite.

ACID WASHING PRIOR TO ION EXCHANGE

The synthetic zeolite of the invention mentioned above may be ion-exchanged with metal ions with some advantages. That is, the ion-exchanged product has better whiteness and shows less discoloration in a weathering test. It has also been found that those advantages may be attained also with synthetic zeolite which is subjected to simpler soaking or washing in an acid liquid.

That is, the invention provides a method of ion-exchanging synthetic zeolite with metal ions, characterized in that the synthetic zeolite is washed with an acid aqueous liquid prior to the ion-exchange.

U.S. Pat. Nos. 4,775,585, 4,911,898 and 4,911,899 referred to in the above Prior Art disclose conditions for ion exchange, such as concentrations of metal salts and pH's during ion exchange, in detail. However, even when ion exchange is conducted according to these conditions, a product zeolite is sometime dark in color and shows less resistance to discoloration in weathering. Further, quality and properties are sometime different from lot to lot even if ion exchange is conducted in steady conditions. Poor whiteness and poor resistance to discoloration in weathering may be serious problems in application fields where appearance of a product is important, such as fibers and polymers and, moreover, sometime accompanied with deterioration of envisaged effects of a product zeolite, such as bacteriocidal property and catalytic property.

Impurities contained in zeolite is thought one reason for deterioration of whiteness and discoloration resistance in weathering and for unsteady quality of a product zeolite. The present inventors have now found that synthetic and natural zeolites available on market contain various impurities. Zeolites obtained from four companies, for instance, are each dispersed in demineralized water and supernatants are analysed for anions. Chloride, sulfate, nitrate and carbonate ions were detected from all of the fours, and nitrite and bromide ions were detected from some of the fours. Sodium aluminate is used as a raw material in the preparation of synthetic zeolite. Unreacted sodium aluminate remains in commercial synthetic zeolite. Analysis of two types of natural zeolite gave iron and calcium in both types and magnesium in one type. Thus, most of zeolites contain various impurities.

Some of these impurities sometime react with metal ions in a solution in ion exchange to adversely affect a product zeolite. For instance, if sodium aluminate comes out in a zeolite dispersion, the pH of the dispersion is raised, which may cause deposition of metal hydroxides or metal oxides. Calcium ion present may cause deposition, such as calcium carbonate, on the zeolite surface, depending upon metal salts and pH in ion exchange. To specifically explain a case where silver ion is supported on zeolite, even if a pH is in an acidic range during ion exchange, halogen ions present form deposition of AgX, where X is chlorine, bromine or iodine, on zeolite, which deteriorates whiteness and discoloration resistance in weathering of a product zeolite. Similarly, sulfide ion present causes deposition such as $Ag_2S$ to darken a product zeolite. A combination of silver ion with halogen and a combination of metal ions, such as silver, copper or mercury, with sulfide ion have strong tendency of causing deposition. Such deposition cannot be completely prevented solely by controlling conditions of ion exchange.

Even when deposition as mentioned above is not formed, metal ions to be supported on zeolite may be consumed to form aluminate if aluminate ion is present, and it is difficult to control the amount of metal ions supported on zeolite. Ion exchange is preferably conducted on zeolite free of such impurities to obtain a product zeolite having high whiteness and discoloration resistance in weathering as well as consistent quality among lots. However, although zeolite in which potassium, calcium and iron contents are specified is available, zeolite is not available from which impurities such as halide and sulfide ions are removed to such extent that no adverse effects are seen in ion exchange. The invention provides a method for preparing a product zeolite having superior whiteness and discoloration resistance in weathering from conventional commercial zeolite.

It is an important requisite of the invention to wash zeolite with an aqueous acid solution prior to ion exchange. It is difficult to obtain an envisaged product zeolite of high whiteness and discoloration resistance in weathering without washing or with washing merely with water or hot water. In contrast, when ion exchange is conducted after washing with an acid solution according to the invention, a product zeolite has remarkably increased whiteness and discoloration resistance in weathering. Particularly, zeolite with very high whiteness and discoloration resistance in weathering is obtained when washing is carried out in conditions that the pH of a zeolite dispersion during washing is in a range of 4 to 8, preferably 4.5 to 6.5.

The acids mentioned above for the buffered acid aqueous liquids may be used here. Weak acids are preferred. Weak acids act on zeolite moderately compared to strong acids and, therefore, a risk of attacking zeolite unfavorably in the washing step is less. Also accordingly, impurities entrapped firmly in zeolite structure will not be eluted from zeolite structure. As long as impurities are entrapped in zeolite structure, they will not cause adverse effects in ion exchange. Further, when added to a zeolite dispersion, weak acid, unlike strong acid, causes only little increase in viscosity and bubbling in a dispersion, so that washing operations may easily be performed. Water is used as a solvent in general, but small amounts of organic solvents may be added.

In an preferred embodiment, a buffer is added to an acid solution. The description above for the buffered acid aqueous liquid for the acid soaking applies also here.

Surfactants may also be added as an optional component. Desulfurizing agents and dehalogenating agents may be used if needed. Oxidizing agents such as hydrogen peroxide may be used.

Washing may be conducted in any manner, and in various conditions depending upon type of zeolite, metals to be supported and applications. In a preferred embodiment, washing is performed with such amounts of acid and buffer as to give a pH of at least 4 and less than 8, particularly 4.5 to 6.5, at the beginning of washing, at a solid to liquid ratio of 1:1 to 1:100, particularly 1:2 to 1:20 for up to 1 hour, typically 10 to 30 minutes. The pH of a dispersion is preferably maintained in the aforesaid range, preferably, until the end of washing. Heating may be conducted optionally. It is generally sufficient to conduct the washing once, but may do it repeatedly. When washing is conducted more than once, washing conditions need not to be the same with each other. One washing among them can be the washing of the invention. Particularly when a dechlorinating agent or desulfurizing agent is used or where a compound used in washing reacts with a compound used in ion exchange to form deposition (e.g. hydrogen halide acid in washing and silver ion in ion exchange), washing with water or hot water is preferably conducted as a last step of the washing operations.

Following the above washing, zeolite is subjected to ion exchange. There is no particular limitation on a method of ion exchange. Any conventional manner may be used. To explain a case where bacteriocidal metal ions such as silver, copper, and zinc ions are supported on zeolite, it is preferred that a pH during ion exchange is on acid side and the concentration of metal salts in solution is lower. Silver and copper ions may form decomposition during ion exchange if the concentration of metal salts and the pH are high. Also when other metal ions are used in ion exchange, those skilled in the art may easily determine conditions such as metal salt concentrations and pH depending upon envisaged properties of a product zeolite.

The ion-exchanged zeolite may be separated from the liquid, washed and dried. Separation may be conducted by filtration, decantation or any other manner. Washing may be carried out in any manner, for instance, with a small amount of demineralized water or an acid solution. Drying may preferably be conducted at 100° to 500° C., particularly 100° to 350° C., at normal or reduced pressure. The ion exchanged zeolite product may be subjected to heating in a hydrogen flow, soaking in an acid or alkaline solution or application of paraffin or wax for hydrophobicity.

ION EXCHANGE BY EXHAUSTIVE ABSORPTION

The synthetic zeolite which has been washed with an acid aqueous liquid or, more preferably, soaked in a buffered acid aqueous liquid as explained above can be ion-exchanged in a new manner. That is, the zeolite is dried and ion-exchanged by absorbing such a small amount of a metal ion solution that is absorbed to exhaustion.

In this embodiment of ion exchange, the amount of a solvent, e.g. water, for metal salts can be decreased, no waste water which contains metal ions occurs and, moreover, procedure of ion exchange is shortened and simplified.

In this embodiment, it is important to wash (or soak) synthetic zeolite with an acid aqueous liquid prior to ion exchange and, then, to exchange with metal ions by letting the zeolite to absorb a metal ion solution to exhaustion. It is believed that impurities contained in synthetic zeolite, particularly alkaline impurities, are removed and a specific surface area of zeolite becomes larger by the washing, and then water in zeolite is removed by drying to enlarge a micropore volume, so that the volume and speed of water to be absorbed are increased. As a result, a desired amount of metal ion can quickly be supported on zeolite by mere exhaustive absorption in a short period of time. If the zeolite is not washed (or soaked) with an acid aqueous solution or washed with mere water or hot water, dried and then subjected to the exhaustive absorption, it is difficult for the zeolite to quickly support a desired amount of metal ions in its micropores and metal compounds will merely adhere to the zeolite to give a product zeolite having poor functions. In extreme cases, metal oxides deposit on the zeolite. Then, as known, absorption ability and bacteriocidal properties will deteriorate.

The washing procedure or soaking procedure may be conducted as explained above. It is possible to conduct some ion exchange at the same time with the washing. For instance, when a part of sodium ions of zeolite is exchanged with $H^+$, $NH_4^+$ or $Ca^{++}$, resistance to weathering is improved.

After the washing, the zeolite is dried. Any known manner for drying may be used. Preferably, the zeolite is dried at 100° to 500°, particularly 200° to 350° C., for 5 minutes to 3 hours, particularly 20 minutes to 1 hour, with air circulation or at reduced pressure. Dry air or nitrogen gas may be passed. Those skilled in the art can choose proper drying conditions, depending upon type of synthetic zeolite and metal ions to be supported later. Sufficient drying after the washing promotes micropore volume and the amount and speed of water to be absorbed, which enables ion exchange through mere exhaustive absorption of a metal ion solution.

To let zeolite to support metal ions, use is made of such a small amount of a metal ion solution that is absorbed substantially to exhaustion. The amount of solution absorbed to exhaustion depends upon type of the synthetic zeolite, the washing conditions, the drying conditions and so on, and is typically about 20 to 200 wt. %, particularly 50 to 150 wt. %. The terms "absorbed substantially to exhaustion" herein mean that almost all of a metal ion solution is absorbed by the zeolite, but the solution need not to completely be absorbed. A part of the solution may remain unabsorbed to wet the zeolite surface or a small amount of liquid phase may remain, which does not diminish the effects of the invention. The above manner can clearly be distinguished from conventional ion exchange where zeolite particles are dispersed in a large amount of a liquid phase.

The above description on metal ions and solutions applied also here.

A metal ion solution may be absorbed to exhaustion in any manner, such as spraying or showering the solution, contacting zeolite spread on a mat with an absorbent, such as sponge or fibers, which holds the metal ion solution, sprinkling zeolite particles on an absorbent which holds the solution, adding the solution to zeolite particles under stirring, or passing the solution through a column where zeolite particles are filled in. Among these manners, the first three may be conducted in a continuous manner using an absorbent in a form of roller or belt as well as in a batch manner. It is preferred to hold the zeolite particles as such for 15 seconds to 2 hours, particularly 20 seconds to 1 hour, after the exhaustive absorption.

After letting the zeolite to support metal ions, the zeolite is optionally washed, and dried. Washing may be conducted using a small amount of distilled water, acid solution or buffered acid solution. Drying may be carried out at 100° to 500° C., preferably 100° to 350° C., under reduced pressure.

In the present manner, the process time is very shortened, a step to separate zeolite from a liquid after supporting of metal ions is not required and, accordingly, supporting of metal ions can be conducted very easily and economically, compared to a conventional manner where zeolite is dispersed in a metal ion solution. Particularly when the whole operations after the washing with an acid solution, i.e., drying, exhaustive absorption, (washing) and drying, are continuously conducted on a belt conveyer, the process time is shortened very much. In a conventional manner by dispersion, time required depends much upon type of synthetic zeolite. For instance, 4 to 6 hours are needed for zeolite A; and 10 to 20 hours for zeolite Y. In the present manner, metal ions may be supported in a short time independent of type of synthetic zeolite. No large amount of waste water containing metal ions occur, which is an advantage of the present manner.

The ion-exchanged zeolite obtained in the present manner has, in most cases, substantially the same levels of functions as those of zeolite obtained in a conventional manner and, therefore, may be used in the same fields.

ION EXCHANGE IN ACID ATMOSPHERE

The synthetic zeolite obtained by the present soaking in a buffered acid aqueous solution or by the washing with an acid solution can advantageously be ion-exchanged by dispersing the zeolite in a metal ion solution whose pH is regulated in a range of 4.0 to 6.5 with weak acid.

As mentioned above, a dispersion of commercially available synthetic zeolite shows alkalinity of pH 10 or higher, sometime pH 11. In such a high pH condition, metal ions to be ion-exchanged may cause deposition of unsoluble compounds. For instance, when a solution of silver ion is made alkaline, silver oxide deposits. Such deposition may deteriorates functions of a product zeolite, such as bacteriocidal properties, and whiteness and resistance to weathering.

It was known to regulate the pH of a zeolite dispersion below 6.5 by adding mineral acid such as hydrochloric acid or nitric acid to prevent the aforesaid deposition. However, when the pH is made below 9 with mineral acid, the zeolite dispersion becomes viscous so that operations are difficult to continue. Thickening is less at a pH below 7, particularly below 6, than at pH 7 to 8, but vigorous bubbling occurs for a while. Accordingly, when ion exchange is conducted at this pH, it is needed that the amount of charged zeolite is small and a large vessel is used to prepare for the bubbling of a zeolite dispersion. Further, ion exchange operation can not be started during the bubbling, which adds to process time.

It has now been found that ion exchange can more easily be conducted using weak acid to regulate the pH. That is, thickening and bubbling of a zeolite dispersion are prevented with the use of weak acid.

When 2N nitric acid or 2N acetic acid is added dropwise to a zeolite dispersion in distilled water, thickening and vigorous bubbling are observed in the case of nitric acid. However, in the case of acetic acid, a little bubbling is observed, but no thickening occurs and, in addition, the pH of the zeolite dispersion becomes almost constant more quickly. For this reason, it is thought that when strong acid is added (or replenished) to a zeolite dispersion, the pH of the liquid becomes low locally so that a part of zeolite is attacked rapidly (for instance, zeolite A is eroded rapidly below pH 4); when weak acid such as acetic acid is used, local drop of the pH of the dispersion liquid is small so that rapid decomposition of zeolite does not occur. As weak acid added is not consumed in decomposition of zeolite, it proceeds with the process of the invention. Further, also during an ion exchange step, a risk of zeolite being unfavorably attacked is smaller with weak acid than strong acid.

The pH of a zeolite dispersion is regulated in a range of 4.0 to 6.5. If the pH is higher than 6.5, some metal ions may cause deposition. If the pH is less than 4.0, zeolite will be eroded.

ION EXCHANGE IN BUFFERED SOLUTION

Ion exchanged of zeolite is preferably conducted in a buffered solution of metal ions.

The pH regulation by the addition of acid as mentioned above sometime causes erosion of zeolite and cannot prevent irregularity in product quality from lot to lot. Moreover, it is not easy to control the pH as desired. These problems are dissolved by conducting ion exchange in a buffered solution of metal ions. At the same time, deposition of metal compounds on zeolite is prevented.

Solutions of some metal salts exhibit a pH above 8 or below 4. The pH varies with a metal salt concentration and, even, with time after the preparation of a solution. In our tests with commercially available salts, solutions of aluminium sulfate, copper sulfate, lead nitrate, cobalt sulfate, copper nitrate, cromium sulfate, beryllium nitrate and thorium nitrate at a concentration of 20 g/100 ml exhibit a pH of about 3; chromium chloride, iron chloride, iron nitrate, iron sulfate, cerium nitrate and cerium sulfate, a pH of around 2. Particularly, iron (II) salts, cerium sulfate and zirconium sulfate sometime show a pH below 1. Iron (II) salts do not give a pH above 3 even at a concentration of 5 g/100 ml. As zeolite decomposes at a pH below 3 or 4, zeolite may easily be eroded in such solutions. Meanwhile, a solution of silver nitrate sometime exhibits alkalinity of pH 8. A dispersion of zeolite itself exhibits strong alkalinity of pH 8 to 12, which alkalinity depends upon types of zeolite, of course, and moreover manufacturers and even lots in the same manufacturers. Ion exchange ability of zeolite may vary with pH level. Accordingly, when a pH of an ion-exchanging solution varies for the aforesaid reasons, the amount of exchanged metal ion in a product zeolite is not constant.

In the present manner of ion exchange, a pH of a solution is kept almost constant with a buffer, so that ion exchange ability of zeolite does not differ from lot to lot and a product zeolite of stable quality is obtained.

Further, if a pH of a metal ion solution becomes 7 to 8 due to contact with zeolite, metal ion, particularly silver or copper ion, will deposit as metal oxide or hydroxide. Even the pH is lowered once with acid, the pH may rise again during ion exchange procedure. Accordingly, addition of acid is required at short intervals to prevent the deposition. If a large amount of acid is added at one time to save labor, zeolite may decompose. Some metal salts give a pH of a solution below 4, where zeolite decomposes. Aluminosilicate released by the decomposition of zeolite and impurities eluted from zeolite structure may react with metal ions to consume metal ions which are to be supported on zeolite and, moreover, may form deposition on zeolite. When zeolite decomposes, a zeolite dispersion may foam. Aluminosilicate released from zeolite makes a zeolite dispersion viscous so that ion exchange procedure becomes difficult. In the present manner of ion exchange, fluctuations in pH of a dispersion is small so that the above problems do not occur and a product zeolite with more constant quality among lots can easily be obtained.

The metal ions mentioned in relation to the soaking in a buffered acid aqueous solution may be used here.

The buffer mentioned hereinbefore may also be used here. Some buffers may react with metal salts to form precipitation. For instance, a buffer consisting of phosphoric acid and sodium phosphate will react with silver, iron or chromium to form deposition of metal phosphate. It is easy for those skilled in the art to choose a buffer which will not cause such a problem. Solvent is generally water, which may however contain a small amount of organic solvents and/or surfactants. An initial pH of an aqueous solution is set preferably in a range of 4.0 to 6.5, particularly 4.5 to 6.0. The amount of a buffer used depends upon types of zeolite and metal ion, and generally consists of weak acid in an amount 1 to 3 times as much as the amount sufficient to neutralize a zeolite dispersion (usually, 0.2 to 0.2 mole per 100 g zeolite) and a salt of weak acid in an amount 0.1 to 10 times as much as the amount of weak acid. If the pH of a dispersion rises up with progress of ion exchange, the pH may be adjusted with a buffered or non-buffered acid (solution). Those skilled in the art may easily determine a preferable buffer and its amount, depending upon types of zeolite and metal salts and application fields of a product zeolite.

The invention will be described in more detail with reference to the following Examples.

EXAMPLES

A pH of water in which zeolite is dispersed (hereinafter sometimes referred to as a pH of zeolite for brevity) were determined as follows: Synthetic zeolite was dried at 105° C. under normal pressure for 2 hours, cooled to room temperature, dispersed in distilled water at a concentration of 50 g/liter and stirred at 20° to 25° C. for 24 hours under stirring at 500 rpm and then the pH was measured at 20° C. using guaranteed electrodes.

For determination of elution of aluminium, a dispersion of 50 g/l were stirred at 20° to 25° C. for 24 hours under stirring at 500 rpm as mentioned above, allowed to stand for 72 hours, and then passed through a 0.45 micron membrane filter to obtain an aliquot of the liquid, which was subjected to atomic absorption spectrophotometry using AA-640-13 Type made by Shimazu Seisakusho Co. The detection limit was 0.5 ppm.

Starting synthetic zeolite used in the Examples is as shown in Table 1. Each synthetic zeolite was, if needed, pulverized and classified to obtain a desired particle size. The water content in Table 1 is that of zeolite which was dried at 105° C.

TABLE 1

| Type of Zeolite | Composition | Average Particle Size, micron | Water Content, % |
|---|---|---|---|
| (1) A | 0.94 Na$_2$O.Al$_2$O$_3$.1.92 SiO$_2$.xH$_2$O | 1.1 | 16.0 |
| (2) Y | 0.99 Na$_2$O.Al$_2$O$_3$.2.55 SiO$_2$.xH$_2$O | 1.6 | 19.8 |
| (3) X | 1.14 Na$_2$O.Al$_2$O$_3$.4.90 SiO$_2$.xH$_2$O | 0.6 | 12.7 |
| (4) A | Commercial Product, foreign G. Co. | 11.8 | 8.2 |
| (5) A | Commercial Product, foreign E. Co. | 3.4 | 7.1 |
| (6) A | Commercial Product, Japanese M. Co. | 3.8 | 6.6 |
| (7) Y | Commercial Product, foreign G. Co. | 5.8 | 11.2 |
| (8) X | Commercial Product, foreign G. Co. | 3.4 | 11.8 |

CONTROL 1 pH's and eluted aluminium concentrations of the aforesaid zeolites (1) to (8) were determined. The results are as seen in Table 2.

TABLE 2

| Zeolite | pH | Eluted Al Concentration, ppm |
|---|---|---|
| (1) A | 12.2 | 32.2 |
| (2) Y | 10.9 | 12.4 |
| (3) X | 11.0 | 10.1 |
| (4) A | 10.9 | 12.9 |
| (5) A | 11.3 | 11.6 |
| (6) A | 10.4 | 15.5 |
| (7) Y | 11.0 | 7.3 |
| (8) X | 10.8 | 9.5 |

EXAMPLE 1

From the synthetic zeolite particles (1), (2), (3) and (4), the synthetic zeolite of the invention were prepared as follows:

In a 2-liter reaction vessel provided with a stirrer, 95 g of sodium acetate were dissolved in 1,000 ml of 2N acetic acid to prepare a buffered acid aqueous liquid of a pH of 5.1, to which 300 g of the synthetic zeolite particles were added little by little to disperse over about 20 minutes at 35° C. under stirring of 500 rpm. After the completion of addition of the zeolite particles, stirring was further continued for 1 hour and it was confirmed that the ph of the dispersion liquid was in a range of 5.5 plus/minus 0.3. Then, stirring was further continued for 0.5 hour and it was again confirmed that the pH of the dispersion liquid was in a range of 5.5 plus/minus 0.3. After solid-liquid separation with a Buchner filtration unit, a small amount of a washing liquid prepared by adding a 10% aqueous acetic acid solution to demineralized water to adjust the pH to 4.0 was poured to the separated zeolite in the Buchner filtration unit to thereby wash the zeolite. The pH of the washing liquid at the end of the washing was in a range of 5.5 plus/minus 0.5. Then the separated synthetic zeolite was subjected to drying at 130° C. for 4 hours to remove water and then pulverized properly into a product using a mortar of the Japanese pharmacopoeia to loosen aggregation.

The resultant synthetic zeolite of the invention was dispersed in distilled water and subjected to the determination of pH and eluted aluminium concentration. The results are as shown in Table 3. Stability to water was very good in all of the cases.

TABLE 3

| Zeolite | pH | Eluted Al Concentration, ppm |
|---|---|---|
| (1) A | 6.9 | below the detection limit |
| (2) Y | 6.6 | " |
| (3) X | 6.6 | " |
| (4) A | 6.5 | " |

EXAMPLE 2

From the synthetic zeolite particles (5), (6), (7) and (8), the synthetic zeolite of the invention were prepared as follows:

In a 2-liter reaction vessel provided with a stirrer, 150 g of ammonium acetate were dissolved in 1,000 ml of 2N acetic acid to prepare a buffered acid aqueous liquid of a pH of 5.3, to which 300 g of the synthetic zeolite particles were added little by little to disperse over about 20 minutes at 45° C. under stirring of 500 rpm. After the completion of addition of the zeolite particles, stirring was further continued for 2 hour and it was confirmed that the pH of the dispersion liquid was in a range of 5.7 plus/minus 0.3. Then, stirring was further continued for 0.5 hour and it was again confirmed that the pH of the dispersion liquid was in a range of 5.7 plus/minus 0.3. After solid-liquid separation with a Buchner filtration unit, a small amount of a washing liquid prepared by adding a 10% aqueous acetic acid solution to demineralized water to adjust the pH to 4.0 was poured to the separated zeolite in the Buchner filtration unit to thereby wash the zeolite. The pH of the washing liquid at the end of the washing was in a range of 5.7 plus/minus 0.5. Then the separated synthetic zeolite was subjected to drying at 130° C. for 4 hours to remove water and then pulverized properly into a product using a mortar of the Japanese pharmacopoeia.

The resultant synthetic zeolite of the invention was dispersed in distilled water and subjected to the determination of pH and eluted aluminium concentration. The results are as shown in Table 4. Stability to water was very good in all of the cases.

TABLE 4

| Zeolite | pH | Eluted Al Concentration, ppm |
|---|---|---|
| (5) A | 6.6 | below the detection limit |
| (6) A | 6.4 | " |
| (7) Y | 6.7 | " |
| (8) X | 6.6 | " |

REFERENCE EXAMPLE

This Example is to show that decomposition of zeolite particles is prevented and soaking operations can be easily carried out with the use of a buffer in an aqueous acid soaking liquid.

In a 2-liter reaction vessel provided with a stirrer, 360 g of sodium acetate were dissolved in 1,000 ml of 2N acetic acid to prepare a buffered aqueous liquid of a pH of 6.1, to which each 50 g of the synthetic zeolite (5) were added at intervals of 5 minutes at room temperature under stirring of 500 rpm. Upon each increment of 100 g of the zeolite added, the pH of the dispersion liquid was determined. The measurement of pH was conducted just before addition of a next portion of the synthetic zeolite. The results are as shown in Table 5.

For comparison, the same procedure was repeated except that no sodium acetate was used (Comparative Reference Example a). The results of the pH measurement are as shown in Table 5.

The pH of the dispersion liquid was apparently very stable in the system where a buffer was used. From the fact that the pH of the dispersion was in a range of 6 to 6.5 in this system, it is inferred that almost no decomposition of the zeolite particles occurred.

TABLE 5

| | pH | |
|---|---|---|
| Zeolite added, g | Reference | Comparison a |
| 0 | 6.1 | 2.5 |
| 100 | 6.1 | 4.4 |
| 200 | 6.2 | 5.5 |
| 300 | 6.3 | 5.8 |
| 400 | 6.3 | 6.0 |
| 500 | 6.4 | 6.3 |
| 600 | 6.4 | 6.8 |
| 700 | 6.5 | 7.3 |
| 800 | 6.5 | 7.9 |

In Comparative Reference Example a, vigorous bubbling was observed until 200 g of the zeolite were added. When 400 g of the zeolite were added, the zeolite dispersion became very thick so that a magnetic stirrer used for stirring did not work. Then, stirring was continued using a stirrer with a motor. In contrast, only slight bubbling and thickening of the dispersion were observed in Reference Example where a buffer was used.

The procedure of the above Comparative Reference Example a was repeated except that 2N nitric acid was used instead of 2N acetic acid, which is referred to as Comparative Reference Example 6. After 24 hours, their viscosities were determined by a Brookfield viscometer at 10 rpm. The results are as shown in Table 6.

TABLE 6

| | Reference | Comparison a | Comparison b |
|---|---|---|---|
| Viscosity, cp | 90 | 2600 | ≧7000 |

COMPARISON EXAMPLE 1

Synthetic zeolite (4), (7) and (8) as used in Examples 1 and 2 were subjected to washing with water or neutralization in the following manner.

WASHING WITH WATER

A hundred (100) g of synthetic zeolite particles were added to 1 liter of demineralized water and dispersed with sufficient stirring, followed by solid-liquid separation with a Buchner filtration unit. Further, several aliquots of 3 liters of demineralized water were poured with care into the filtration unit from above, and it was confirmed that the pH of the filtrate was approximately 7. The washed zeolite was taken out, dried at 130° C. for 4 hours and pulverized properly.

NEUTRALIZATION

A hundred (100) g of synthetic zeolite particles were added to 1 liter of demineralized water and dispersed with sufficient stirring, followed by filtration with a Buchner filtration unit. Then, diluted nitric acid was poured with care for neutralization. After the pH of the neutralizing water was confirmed to be approximately 6.5 for 5 minutes, the neutralization was ended. The neutralized zeolite particles were taken out, dried at 130° C. for 4 hours and pulverized properly.

The resultant zeolite was dispersed in distilled water to determine the pH and eluted aluminium concentration. The results are as shown in Table 7. Almost no improvement was made on the pH values, which were almost unstable, compared to Tables 1 and 2. Probably as a result of the above, elution of aluminium was at a similar level as before the treatment, and the situation was recognized as auto-destruction. That is, even though the pH was adjusted to about 7 by washing with water or neutralization, the pH became around 10 when dispersed in water later.

TABLE 7

| Zeolite | Treatment | pH | Eluted Al Conc., ppm |
|---------|-----------|-----|----------------------|
| (4) A | Washing | 9.4 | 9.1 |
| (7) Y | Washing | 9.5 | 5.4 |
| (8) X | Washing | 9.2 | 7.2 |
| (4) A | Neutralization | 9.0 | 8.1 |
| (7) Y | Neutralization | 9.3 | 5.4 |
| (8) X | Neutralization | 8.9 | 6.8 |

EXAMPLE 3

The procedure of Example 1 was repeated with 300 g of the synthetic zeolite particles (5) except that the synthetic zeolite was dispersed in a solution of 5 g of water glass ($SiO_2$ content 35-38%) in 300 ml of demineralized water and then added in the form of slurry to the buffered acid aqueous liquid.

The pH and eluted aluminium concentration of the obtained zeolite were determined. The results are as shown in Table 8. Excellent stability is seen.

TABLE 8

| Zeolite | pH | Eluted Al conc. |
|---------|-----|-----------------|
| (5) A | 6.8 | below the detection limit |

EXAMPLE 4

The procedure of Example 1 was repeated with 300 g of the synthetic zeolite particles (5) except that 20 g of colloidal silica (Snow Tex C, trade mark) were added to the buffered acid aqueous liquid in advance.

The pH and eluted aluminium concentration of the obtained zeolite were determined. The results are as shown in Table 9. Excellent stability is seen.

TABLE 9

| Zeolite | pH | Eluted Al conc. |
|---------|-----|-----------------|
| (5) A | 6.6 | below the detection limit |

EXAMPLE 5

In this example, silver ion was given to synthetic zeolite particles (1) through ion exchange. Then synthetic zeolite of the invention was prepared from this zeolite-Ag. The same reaction apparatus as in Example 1 was used with the exception that the reaction vessel was further provided with a silver nitrate-dropping instrument.

Two hundred (200) g of zeolite A(1) which had been washed with water were placed in the reactor, in which 1 liter of a 0.5% aqueous silver nitrate solution was added from the dropping instrument and, then, stirred and mixed at a temperature of 35° C. and a stirring speed of 500 rpm for 5 hours to perform ion exchange reaction to thereby form silver-exchanged zeolite. Next, excess silver nitrate was removed by filtration and washing with water, while confirming that the neutral pH was attained, followed by drying and pulverization.

A hundred (100) g, i.e. approximately one half, of the above zeolite-Ag were subjected to the process of the invention. 6.0 g of acetic acid (almost 100% pure) and 7.6 g of sodium acetate were dissolved in 1 liter of demineralized water in the same reactor to prepare a buffered aqueous solution. The pH of it was about 5. To this were added 100 g of the zeolite-Ag little by little to disperse at 35° C. under stirring at 500 rpm over 20 minutes.

After the completion of addition of the zeolite particles, stirring was further continued for 1 hour and it was confirmed that the pH of the dispersion liquid was in a range of 5.5 plus/minus 0.3. Then, stirring was further continued for 0.5 hour and it was again confirmed that the pH of the dispersion liquid was in a range of 5.5 plus/minus 0.3. (If the pH rises above the predetermined value, the pH may be adjusted with a buffered acid solution of the same composition or a non-buffered acid solution.)

After solid-liquid separation with a Buchner filtration unit, the zeolite-Ag was subjected to drying at 130° C. for 4 hours without washing with water and then pulverized properly into a product using a mortar of the Japanese pharmacopoeia.

The obtained synthetic zeolite-Ag of the invention and the non-soaked one were subjected to the determination of pH and eluted aluminium concentration. The results are as shown in Table 10.

Difference in stability to water is apparent between these. The zeolite-Ag of the invention had a neutral and stable pH with no aluminium elution, and shows no auto-destruction.

TABLE 10

| Zeolite | Process | pH | Eluted Al, ppm |
|---------|---------|-----|----------------|
| (1) A—Ag | Control | 9.5 | 15.6 |
| (1) A—Ag | Invention | 6.7 | below the detection limit |

Besides, in another embodiment, zeolite was ion-exchanged with the use of silver nitrate while maintaining the pH of the ion-exchanging liquid at 5.0 with acetic acid and sodium acetate, and then filtered and dried without washing with water. This synthetic zeolite according to the invention showed a pH of 6.6.

EXAMPLE 6

In a 2-liter reaction vessel, 100 g of acetic acid and 60 g of sodium acetate were place, to which 1,000 ml of demineralized water were poured to dissolve them. The pH of this buffered solution was 4.4. To the solution were added 200 g of the synthetic zeolite (5) little by little over about 20 minutes at room temperature under stirring of 500 rpm to disperse. Then, the liquid temperature was raised to 60° C., at which stirring was continued for further 1 hour. After the dispersion was cooled to room temperature (pH 5.2), stirring was continued for further 4 hours and it was confirmed that the pH of the dispersion was in a range of 5.2 plus/minus 0.3 and then the soaking process was ended. After solid-liquid separation with a Buchner filtration unit, 3 liters of demineralized water was poured little by little to the separated zeolite in the Buchner filtration unit to thereby wash the zeolite. The pH of the washing liquid at the end of the washing was below 6.5. Then the separated synthetic zeolite was subjected to drying at 130° C. for 3 hours to remove water and then pulverized properly into a product using a coffee mill.

The resultant synthetic zeolite of the invention was dispersed in distilled water and subjected to the determination of pH and eluted aluminium concentration. The pH was 6.4 and the aluminium concentration was below the detection limit.

For comparison, another portion of the synthetic zeolite (5) was subjected to the same soaking procedure as mentioned above except that neither acetic acid nor sodium acetate was used. Thus, this is washing with hot water. Another portion of the synthetic zeolite (5) was also treated similarly where acetic acid was used, but no sodium acetate was used, which is referred to as acid soaking. Other portions of the synthetic zeolite (5) were heat-treated at 450° C. or 300° C. for 2 hours.

An angle of response of these zeolite particles was determined where each sample zeolite was dried at 105° C. for 2 hours and then allowed to cool to room temperature before the measurement. The results are as shown in Table 11.

The zeolite of the invention apparently exhibits high flowability.

TABLE 11

| Zeolite | Angle of Response, degree |
|---|---|
| Untreated | 55–57 |
| Invention | 26–29 |
| Washed with hot water | 55–57 |
| Soaked in acid | 43–45 |
| Heat-treated at 450° C. | 55–57 |
| Heat-treated at 300° C. | 55–57 |

Figure 1B:
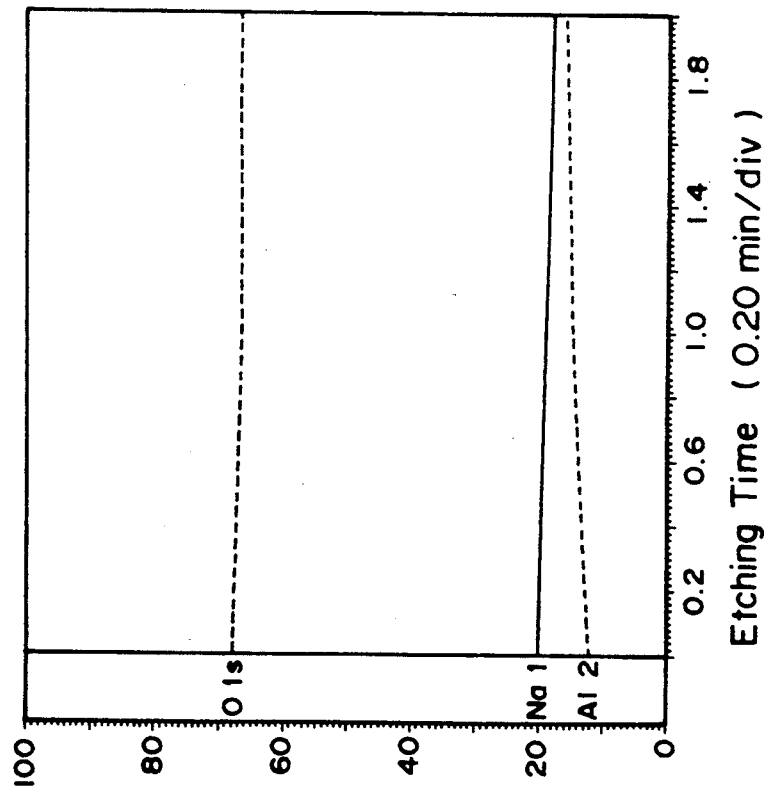

Ratios of sodium, aluminium and oxygen in the zeolite of the invention were determined along the depth direction from the surface of the zeolite particles by ESCA, where the zeolite particles were pressed to a plate by pressure of 10 tons to mount them evenly on the plate. The results are as shown in FIGS. 1a and 1b. For comparison, the untreated synthetic zeolite (5) was also subjected to ESCA, whose results are as shown in FIGS. 2a and 2b.

In the figures, Na, Al and O are percentage of these atoms (total 100). The abscissa is etching time. In FIG. 1a, one division is 0.20 minute. FIG. 1a is followed by FIG. 1b where one division is 2.00 minutes. Thus, total etching time was 21 minutes. The zeolite may be etched by 5 nm per minute and, thus, would be etched in depth of 105 nm in total, which is about 1/16 of the zeolite radius (1.7 $\mu$m).

Figure 2B:
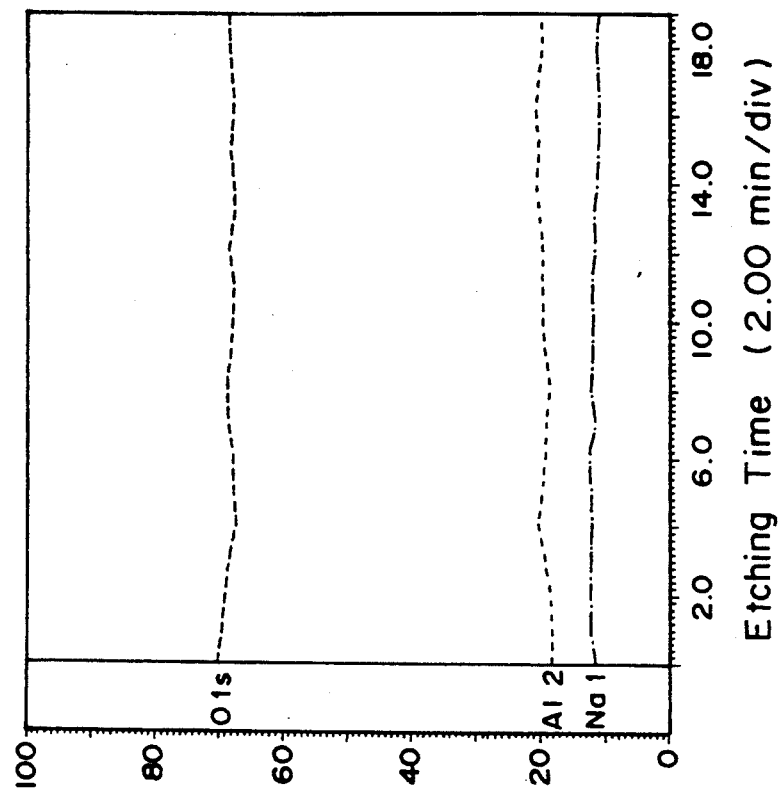
FIGS. 2a and 2b are depth analysis graphs with ESCA on raw material zeolite particles.
Figure 2A:
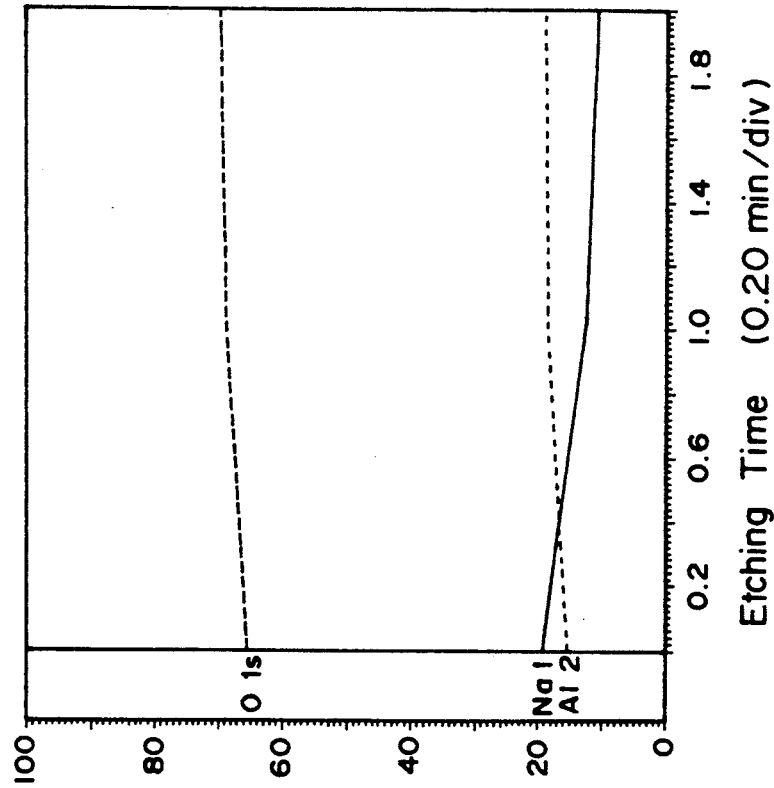

In FIGS. 2a and 2b, the sodium ratio is higher than aluminium at the surface of the untreated zeolite, but goes into reverse in the inner part of the zeolite. The oxygen ratio is not constant, either. That is, the composition is not uniform in a particle.

Meanwhile, in the zeolite particles of the invention as shown in FIGS. 1a and 1b, the composition is much uniform along the depth direction. The ratio of Na to Al in the zeolite of the invention is larger than that of the untreated zeolite. Accordingly, it is concluded that the zeolite of the invention is not one where sodium ion in zeolite was simply replaced with hydrogen ion by the treatment with an acid solution.

Acid Washing Prior To Ion Exchange

In the following Examples, both whiteness and resistance to discoloration in weathering are Hunter whiteness measured by a TC-1 colorimeter made by Tokyo Denshoku Industries Co. Zeolite for determining whiteness is dried at 105° C. for 2 hours, filled in a plastic ring of 40 mm in inner diameter and pressed at 10 tons pressure by a press into a sample having a smooth surface.

To determine resistance to discoloration in weathering, a sample which has been subjected to measurement of whiteness is exposed to arc lamp irradiation for 40 hours with reference to the Japanese Industrial Standard (JIS) L-0842.

EXAMPLE 7 AND COMPARISON EXAMPLE 2 AND 3

0.6 kg of zeolite A was dispersed in 5.0 liters of demineralized water under stirring, to which was added a solution of various amounts of acetic acid (almost 100% pure) in 0.5 liter of demineralized water, and stirred at room temperature under stirring of 500 rpm. After solid-liquid separation with a Buchner filtration unit, demineralized water was poured to the separated zeolite to wash it.

The zeolite after the washing was again dispersed in 5.0 liters of demineralized water at room temperature under stirring of 500 rpm, to which was added a solution of 30 g of silver nitrate in 2.0 liters of demineralized water over about 20 minutes. After stirring for further 20 hours and solid-liquid separation with a Buchner filtration unit, the zeolite was washed with demineralized water, dried at 130° C. for 4 hours and pulverized into a product.

For comparison, washing was conducted without addition of acetic acid (i.e., washing with water), followed by the same ion exchange (Comparison 2), or the same ion exchange was conducted without washing (Comparison 3) to obtain silver-supporting zeolite A.

The whiteness of each zeolite is shown in Table 12 together with the amount of acetic acid and the pH of the dispersion at the beginning of washing. It may be seen that the zeolite which was washed with an acid solution before ion exchange according to the invention has higher whiteness than the zeolite which was washed with water or was not washed before ion exchange.

TABLE 12

| | Acetic Acid, g | Initial pH in Washing | Whiteness |
|---|---|---|---|
| Comparison 2 | 0 | 11 | 64.9 |
| Ex. 7a | 30 | 7.0 | 85.1 |
| Ex. 7b | 50 | 5.5 | 85.4 |
| Ex. 7c | 100 | 4.5 | 84.8 |
| Comparison 3 | No washing | — | 62.4 |

EXAMPLE 8

50.0 g of acetic acid (almost 100% pure) and 68.5 g of sodium acetate were dissolved in 5.0 liters of demineralized water to prepare a buffered aqueous solution of a pH of 4.8, to which was added 0.6 kg of zeolite A little by little over 20 minutes and dispersed to be washed at room temperature under stirring of 500 rpm. The pH of the zeolite dispersion after the washing was 5.6, which is higher than that of the starting solutions only by 0.8. After solid-liquid separation with a Buchner filtration unit, 2.0 liters of demineralized water was poured to the separated zeolite to wash it.

The zeolite after the washing was again dispersed in 5.0 liters of demineralized water at room temperature under stirring of 500 rpm, to which was added a solution of 30 g of silver nitrate in 2.0 liters of demineralized water over about 20 minutes. After stirring for further 20 hours and solid-liquid separation with a Buchner filtration unit, the zeolite was washed with demineralized water, dried at 130° C. for 4 hours and pulverized into a product. For confirmation, concentrated hydrochloric acid was added to the filtrate after the ion exchange to find no white precipitation of silver chloride. Thus, almost all of the silver ion was supported on the zeolite.

The whiteness (Hunter whiteness) of the product obtained was 87.5.

EXAMPLES 9 TO 11 AND COMPARISON EXAMPLE 4

0.6 kg of zeolite A was dispersed in 5.0 liters of demineralized water under stirring of 500 rpm, to which was added a solution of 60 g of various acids in 0.5 liter of demineralized water over 20 minutes, heated to a temperature of 80° C. and stirred for 30 minutes. The pH's of the dispersions at the end of the addition of acid were all in a range of 4.5 to 5.5. After cooling to room temperature and solid-liquid separation with a Buchner filtration unit, the zeolite was washed with demineralized water, dried at 130° C. for 2 hours and pulverized into a product.

The zeolite after the washing (about 0.6 kg) was again dispersed in 5.0 liters of demineralized water at room temperature under stirring of 500 rpm, to which was added a solution of 30 g of silver nitrate in 2.0 liters of demineralized water over about 20 minutes. After stirring for further 20 hours and solid-liquid separation with a Buchner filtration unit, the zeolite was washed with demineralized water, dried at 130° C. for 4 hours and pulverized into a product.

For comparison, washing was conducted without addition of acetic acid, wherein the initial pH of the dispersion after the addition of zeolite was about 11, followed by the same ion exchange.

The whiteness of each zeolite is shown in Table 13 together with the type of acid used in washing. It may be seen that the zeolite which was washed with an acid solution before ion exchange according to the invention has higher whiteness and resistance to discoloration in weathering than the zeolite which was washed with water before ion exchange.

TABLE 13

|  | Acid | Whiteness | Whiteness after Weathering |
|---|---|---|---|
| Example 9 | Acetic acid | 92.2 | 84.9 |
| Example 10 | Oxalic acid | 89.8 | 81.6 |
| Example 11 | Tartaric acid | 89.2 | 80.4 |
| Comparison 4 | — | 72.0 | 51.2 |

EXAMPLE 12

50.0 g of acetic acid (almost 100% pure) and 68.5 g of sodium acetate were dissolved in 5.0 liters of demineralized water to prepare a buffered aqueous solution of a pH of 4.8, to which was added 0.6 kg of zeolite A little by little over 20 minutes, heated to 80° C. and stirred to wash for 30 minutes under stirring of 500 rpm. After solid-liquid separation with a Buchner filtration unit, 2.0 liters of demineralized water was poured to the separated zeolite to wash it.

The zeolite after the washing was again dispersed in 5.0 liters of demineralized water at room temperature under stirring of 500 rpm, to which was added a solution of 30 g of silver nitrate in 2.0 liters of demineralized water over about 20 minutes. After stirring for further 20 hours and solid-liquid separation with a Buchner filtration unit, the zeolite was washed with demineralized water, dried at 130° C. for 4 hours and pulverized into a product. For confirmation, concentrated hydrochloric acid was added to the filtrate after the ion exchange to find no white precipitation of silver chloride. Thus, almost all of the silver ion was supported on the zeolite.

The whiteness of the product obtained and the whiteness after weathering (Hunter whiteness) were 92.9 and 88.7, respectively, which are higher than those of Example 9, despite the smaller amount of acid used.

REFERENCE EXAMPLE

This is to show that erosion of zeolite particles is prevented by co-existence of a buffer.

A small amount of zeolite A was dispersed in an aqueous acetic acid of 2.0M (120 g/liter, pH 2.4) under stirring for 20 hours. The zeolite dissolved therein.

Meanwhile, a small amount of zeolite A was dispersed in a buffered aqueous solution of acetic acid of 2.0M and sodium acetate of 4.0M (pH 5.1) under stirring for 20 hours. No change occurred on the zeolite particles.

ION EXCHANGE BY EXHAUSTIVE ABSORPTION

Among the zeolite shown in Table 1, the following ones were used.

| Zeolite | Water Content, % | Saturated Water Content, % |
|---|---|---|
| (4) A | 19.36 | 95 |
| (5) A | 19.02 | 80 |
| (6) A | 18.69 | 70 |
| (7) Y | 23.55 | 150 |
| (8) X | 21.61 | 125 |

In the above, the water content was calculated from the difference in weight before and after drying at 210° C. for 2 hours. The saturated water content means the amount of water which zeolite can absorb to exhaustion and is obtained as follows: 20 g of zeolite are put in a graduated cylinder with ground stopper, to which were added 50 ml of water and shaked up and down to fully contact the zeolite with water. Then, defoaming and condensing are performed by giving a constant vibration with a hand vibrator to the cylinder, which is then allowed to stand at room temperature. One week after, constant vibration is given again and zeolite is separated and the volume of the remaining water is weighed.

$$Saturated\ water\ content = [(V_1 - V_2)/W] \times 100$$

where

W = weight of zeolite (20 g)
$V_1$ = total weight of water (50 g)
$V_2$ = weight of the remaining water in gram To make zeolite to absorb a metal ion-containing solution to exhaustion, the following three cloths and sponge sheet were used.

(a) Glass cloth

Plain cloth, 0.50 mm in thickness, 480 g/m² in density. Free Water hold, 25%; water hold after sucking, 10%.

(b) Polyester cloth

Plain thin cloth, 0.08 mm in thickness, 25 g/m² in density.

Free water hold, 55%; water hold after sucking, 5%.

(C) PVA sponge sheet

Porous, 2.00 mm in thickness, 260 g/m² in density.

Free water hold, 550%; water hold after sucking, 150%.

Free water hold is determined as follows: a sample, 10 cm × 10 cm, is weighed, dipped in water and hung for 10 minutes. Then, it is weighed again. Weight of water held by the sample per weight of the sample is free water hold (wt. %).

Water hold after sucking is determined as follows: the sample after hung as mentioned above is sandwiched with blotting paper, pressed at 1.0 kg/cm² and weighed. Weight of water held per weight of the sample is water hold after sucking (wt. %).

In the following Examples, bacteriocidal properties of zeolite were determined by measuring minimum inhibitory concentration (MIC) to Pseudomonas aeruginosa and Aspergillus niger.

EXAMPLE 13

Using the synthetic zeolite (4), (7) and (8), the procedure of the invention was conducted as follows.

1.0 kg of zeolite particles was dispered in a buffered acid washing liquid (pH 5.3) prepared by dissolving 600 g of ammonium acetate in 4.0 liters of 2N acetic acid and stirred for 2 hours, followed by solid-liquid separation with a Buchner filtration unit. The pH of the filtrate was about 5.5 in each case. Then, 4.0 liters of demineralized water were poured little by little to sufficiently wash the zeolite particles, followed by drying at 130° C. for 4 hours and light pulverization to loosen aggregation.

0.5 kg of the zeolite thus washed and dried was evenly spread in the form of a mat on the glass cloth (a) of 50 cm × 100 cm, covered with the aforesaid polyester cloth (b) and given a light pressure to form a zeolite mat of 3 mm in thickness. The zeolite mat was dried in this state at 210° C. for 10 minutes with air ventilation and then the pressure was removed. The PVA sponge sheet (c), 150 cm × 100 cm, holding a 0.1M silver nitrate aqueous solution in an amount 5.5 times as much as its own weight (i.e., containing 715 ml of a 0.1M silver nitrate aqueous solution) was quickly spread on the polyester cloth to cover the whole, to which a load of 50 kg was loaded to press the whole surface for 30 seconds so as to make the silver nitrate solution held by the sponge sheet to migrate to the whole surface of the dried zeolite almost evenly. After these operations, the amount of silver nitrate aqueous solution remained in the sponge sheet was 1.5 times as much as its own weight (i.e., 195 ml). It was observed that almost all of the migrated silver nitrate solution (about 520 ml) was absorbed by the zeolite. (The glass cloth and polyester cloth are less water-absorptive.) The sponge sheet on the zeolite mat was removed. The zeolite mat was heated at 60° C. for 20 minutes in an air-circulated tunnel dryer and then at 130° C. for 20 minutes for fixing the silver ion on the zeolite and drying, and pulverized properly to loosen aggregation.

The measured MIC of each zeolite obtained is shown in Table 14 together with the approximate time and water amount needed for the preparation.

COMPARISON EXAMPLE 5

For comparison, the following operations were conducted using the same synthetic zeolite as used in Example 13.

0.5 kg of synthetic zeolite which had been washed and dried as in Example 13 was placed in a 5-liter reaction vessel provided with a stirrer, to which were added 3.0 liters of demineralized water and stirred to disperse at 20° C. and 500 rpm. To this were added 520 ml of a 0.1M silver nitrate aqueous solution over 20 minutes, heated to 60° C. and stirred to allow the zeolite to support silver ion. The stirring was ended after confirmed that a filtrate from a small portion of the treating liquid did not cause white precipitation of silver chloride by the addition of concentrated hydrochloric acid. The process time was 3 hours for zeolite (4) and 8 hours for zeolite (7) and (8). The zeolite particles were separated with a Buchner filtration unit, to which 3.0 liters of demineralized water were poured little by little to wash. The zeolite was dried at 130° C. for 4 hours and pulverized properly into a product.

The measured MIC of each zeolite obtained is shown in Table 14 together with the approximate time and water amount needed for the preparation.

TABLE 14

| Zeolite | Process | Time, hour | Water, liter | MIC, ppm P. aeruginosa | A. niger |
|---|---|---|---|---|---|
| (4) A | Invention | 1 | 0.7 | 250 | 500 |
|  | Comparison | 10 | 6.5 | 500 | 500 |
| (7) Y | Invention | 1 | 0.7 | 250 | 500 |
|  | Comparison | 15 | 6.5 | 250 | 500 |
| (8) X | Invention | 1 | 0.7 | 250 | 500 |
|  | Comparison | 15 | 6.5 | 500 | 500 |

In the above Table, the time does not include the time necessary for the operations which are common in Example 13 and Comparison Example 5, i.e., washing and drying of zeolite prior to the ion exchange as well as final pulverization. The amount of water does not include the amount of water needed for washing zeolite prior to the ion exchange.

From the Table, it may be seen that the zeolite processed according to the invention has bacteriocidal properties better than or similar with those of zeolite processed by a conventional ion exchange method. Further, a very small amount of a metal ion-containing solution is used in the invention, so that substantially no waste water which contains metal ions at high concentrations occurs. In addition, ion exchange can be carried out easily in a shorter time.

EXAMPLE 14

The synthetic zeolites (5) and (6) were subjected to washing and drying at 130° C. for 4 hours as in Example 13, followed by the following operations.

The zeolite was placed evenly in an amount of 20 g per 100 cm² on the glass cloth (a), covered with the polyester cloth (b) and pressed lightly to form a zeolite mat of 5 mm in thickness. It was then dried at 105° C. for 15 minutes with air ventilation, on which a 0.1M silver nitrate aqueous solution was sprayed quickly through the polyester cloth (b). The amount of the silver nitrate solution sprayed was such that the sprayed solution spread over the whole zeolite mat, but did not leak through or drop from the glass cloth (a) lying below. Then, the zeolite mat which was impregnated with the silver nitrate solution was placed in an air-circulated tunnel dryer at 55° C. for 20 minutes and then at 130° C. for 20 minutes to remove water. The zeolite particles thus obtained were pulverized lightly just to disperse the particles and subjected to MIC determination. The results are as shown in Table 15.

TABLE 15

| Zeolite | MIC, ppm | |
|---|---|---|
| | P. aeruginosa | A. niger |
| (5) A | 250 | 500 |
| (6) A | 250 | 500 |

It may be seen that the zeolite obtained in this Example has the same good bacteriocidal properties as the product of Example 13 from zeolite (4). The zeolite obtained in this Example was almost white, which is commercially valuable.

Comparison Example 6

Without washing and drying prior to ion exchange, silver ion was supported on zeolite (5) as in Example 14.

In this Comparison Example, the silver nitrate aqueous solution did not smoothly penetrate into the zeolite mat, flowed on the zeolite mat and, somewhere, did not penetrate at all. Thus, it was impossible to apply the silver nitrate solution uniformly over the whole zeolite mat, which is in contrast with Example 14.

The MIC determined after drying was apparently worse than those of the Examples of the invention. The zeolite of this Comparison Example was of streaked grey color as a whole and had brownish grey spots. Further, the zeolite particles adhered dottedly to the glass cloth (c) and caused a problem in recovering the zeolite.

COMPARISON EXAMPLE 7

Unwashed zeolite as used in Comparison Example 6 was subjected to drying at 105° C. for 15 minutes and then ion exchanged as in Example 14. Penetration of the silver nitrate into the zeolite mat was a little improved compared to Comparison Example 6, but the surface layer of the zeolite mat obtained (1.5 to 2 mm) was of pale grey color and had less bacteriocidal properties.

ION EXCHANGE IN ACID ATMOSPHERE

EXAMPLE 15

To a dispersion of 200 g of zeolite A in 200 ml of demineralized water (solid/liquid, 1/1) was added acetic acid (concentration 98% or higher) dropwise at every one minute from a burette under stirring of 10 rpm, and the viscosities of the dispersion as well as pH's were measured. A Brookfield viscometer made by Tokyo Keiki Seisakujo Co. was used to measure viscosity. The same procedure was repeated using concentrated nitric acid (about 16N) instead of acetic acid. The results are as shown in Table 16.

The viscosity of the dispersion increased remarkably in the case of nitric acid, while it rather decreased in the case of acetic acid. Where concentrated nitric acid was used, the zeolite dispersion foamed with the addition of the acid and, particularly, vigorous bubbling was observed in a pH range of 6.7 to 7.5. Meanwhile only a slight bubbling was observed in the case of acetic acid.

TABLE 16

| pH | (Viscosity, cp) | | | | | |
|---|---|---|---|---|---|---|
| | ≧11* | 9.5 | 8.5 | 7.5 | 7.0 | 5.5 |
| Nitric acid | 2100 | 3400 | 10200 | 9600 | 8600 | 4900 |
| Acetic acid | 2100 | 1900 | 1800 | 1600 | 1600 | 910 |

*No acid added

EXAMPLE 16

In a 2-liter reaction vessel provided with a stirrer, 1.0 liter of demineralized water was place, to which was added 0.5 kg of synthetic zeolite A to disperse at 25° C. under stirring of 500 rpm. 300 ml of a mixture of demineralized water and a variable amount of 6M acetic acid aqueous solution were added over 10 minutes and stirred for further 30 minutes. Then, a solution of 4.5 g of silver nitrate in 200 ml of demineralized water was added over 1 hour. Upon the completion of the addition, the zeolite dispersion (solid, liquid, ½) was heated to 60° C. and stirred for further 5 hours. After solid-liquid separation with a Buchner filtration unit, 1.0 liter of demineralized water was gradually added to wash the zeolite, which was dried at 130° C. for 4 hours and pulverized properly using a mortar of the Japanese pharmacopoeia.

The zeolite-Ag obtained was filled in an aluminium ring of 45 mm inner diameter and pressed at 10 tons pressure by a press into a test sample. Hunter whiteness (HW) was determined using TC-1 colorimeter made by Tokyo Denshoku Industries Co.

The amount of the 6M acetic acid aqueous solution, the pH immediately after the completion of addition of the aqueous silver nitrate solution to the zeolite dispersion and the viscosity at that time as well as the Hunter whiteness are as shown in Table 17.

COMPARISON EXAMPLE 8

The procedure of Example 16 was repeated except that 6M nitric acid was used instead of 6M acetic acid, where a larger amount of 6M nitric acid was needed to gain the same pH as in the corresponding Example. The results are as shown in Table 17.

TABLE 17

| | Control | Comp. | Ex. | Comp. | Ex. | Comp. |
|---|---|---|---|---|---|---|
| 6 M Acetic acid, ml | — | — | 80 | — | 240 | — |
| 6 M Nitric acid, ml | — | 50 | — | 120 | — | 300 |
| pH | 10.6 | 8.7 | 6.4 | 6.6 | 4.8 | 4.8 |
| Viscosity, cp | <5 | 155 | <5 | 110 | <5 | 45 |
| H.W. | 61.5 | 64.8 | 81.2 | 74.9 | 76.9 | 67.9 |

As seen from the table, no increase in viscosity was observed in the Example where acetic acid was used, while large increase in viscosity was observed in the Comparison where nitric acid was used. Further, the zeolite dispersion exhibited only a slight bubbling around a pH of 6.8 and the stirring and filtration were easy in the case of acetic acid, while vigorous bubbling of the zeolite dispersion was observed below pH 7.0 in the case of nitric acid.

The zeolite-Ag prepared in the presence of acetic acid according to the invention had better whiteness than those prepared at a similar pH using nitric acid.

ION EXCHANGE IN BUFFERED SOLUTION

EXAMPLE 17

Zeolite (6) shown in Table 1 was used.

Zeolite particles were washed with water prior to ion exchange as follows. To 360 g of zeolite particles were added 3.6 liters of demineralized water to disperse under stirring, followed by filtration with a Buchner unit. 10.8 liters of demineralized water were carefully poured portionwise and the washing was ended after the pH of the final filtrate was about 7.

In a 5-liter reaction vessel provided with a stirrer, 3.0 liters of demineralized water were placed, in which were dissolved 120 g of acetic acid and 500 g of sodium acetate at 50° C. to prepare a buffered liquid of a pH of 5.5. To this solution, a solution of 18 g of silver nitrate and 100 g of ferric nitrate ($Fe(NO_3)9H_2O$) in 0.6 liter of demineralized water was admixed little by little to prepare a buffered liquid containing metal ions of pH 5.0.

To the above reaction vessel whose content was cooled to 30° C., a slurry of the whole washed zeolite in 0.4 liter of demineralized water was added at 30° C. over 30 minutes under stirring of 500 rpm. After the completion of the addition, it was still stirred at 30° C. for further 10 minutes, heated to 60° C. and stirred for further 3 hours to end ion exchange.

The zeolite was separated with a Buchner unit, washed by pouring 0.5 liter of an acetic acid solution in demineralized water (pH 4.0), dried at 130° C. for 4 hours and pulverized properly with a mortar of the Japanese pharmacopoeia (Example 17a).

Besides, the above procedure was repeated except that a zeolite slurry was added to a buffered metal salts solution over 10 minutes (Example 17b) or 5 minutes (Example 17c).

Bacteriocidal properties of the zeolite obtained were evaluated by MIC to *Escherichia coli*, *Pseudomonas aeruginosa*, *Staphylococcus aureus* and *Aspergillus niger*. The results are as shown in Table 18.

TABLE 18

| Example | Time, min. | (MIC, ppm) E. coli | P. aeruginosa | S. aureus | A. niger |
|---|---|---|---|---|---|
| 17a | 30 | 250 | 250 | 250 | 500 |
| 17b | 10 | 250 | 250 | 250 | 500 |
| 17c | 5 | 250 | 250 | 250 | 500 |

Zeolite having excellent antibacterial properties were obtained according to the invention, regardless of the time of the addition of zeolite. Comparison Example 9

The same procedure as in Example 17 was repeated except that neither acetic acid nor sodium acetate was used. The bacteriocidal properties of the ion-exchanged zeolite were evaluated as in Example 17. The results are as shown in Table 19. The pH of a metal salts solution prior to the addition of zeolite was 1.2.

TABLE 19

| Comparison | Time, min. | (MIC, ppm) E. coli | P. aeruginosa | S. aureus | A. niger |
|---|---|---|---|---|---|
| 9a | 30 | 500 | 1000 | 1000 | 2000 |
| 9b | 10 | 1000 | 1000 | 2000 | 2000 |
| 9c | 5 | 2000 | 2000 | 2000 | 4000 |

Zeolite obtained by ion exchange, as previously, with no buffer has some bacteriocidal properties which are however apparently inferior to those of zeolite obtained by the process of the invention. Further, the properties of zeolite vary depending upon time of addition of zeolite in a conventional process. Example 18 and Comparison Example 10

This Example is to show that erosion on zeolite is prevented with the use of a buffer.

A slurry of about 36 g of zeolite A, washed as in Example 17, in about 40 ml of demineralized water was added to the same metal salts solution as used in Comparison Example 9 (pH 1.2) at 30° C. and 500 rpm. After 15 minutes, all of the zeolite particles dissolved. The pH of the liquid was 2.9.

The same slurry was added to the same buffered metal salts solution (pH 5.0) as used in Example 17 at 30° C. and 500 rpm. No damage was observed on the zeolite particles after 15 minutes and the pH of the dispersion was almost unchanged, i.e., 5.1.

The same experiments as above were repeated with unwashed zeolite A to find the same results both in a case of the non-buffered system and a case of the buffered system.

EXAMPLE 19

360 g of sodium acetate were dissolved in 0.9 liter of 2N acetic acid to prepare a buffered solution (pH 6.1), to which was added a solution of 9 g of silver nitrate in 0.1 liter of 2N acetic acid to prepare a metal salt solution (pH 6.1). To the solution after cooled to room temperature were added 800 g of the same unwashed zeolite A as used in Example 17 by each 50 g at intervals of 5 minutes at room temperature under stirring of 500 rpm. The stirring was ended 5 minutes after the whole zeolite was added, where the pH of the dispersion was 6.5. The zeolite dispersion thickened and foamed only slightly so that the ion exchange procedure was conducted easily.

Then the dispersion was allowed to stand one day at room temperature. Its viscosity was 90 cp, measured by a Brookfield viscometer at 10 rpm.

Subsequently, the zeolite particles were separated, washed, dried and subjected to MIC measurement as in Example 17. Good bacteriocidal properties were recognized.

COMPARISON EXAMPLE 11

The procedure of Example 19 was repeated except that neither acetic acid nor sodium acetate was used. The pH the metal salt solution was 2.4 before the addition of zeolite; 4.4 after the addition of 100 g of zeolite; 5.9 after the addition of 400 g of zeolite; and 7.8 at the end of stirring. Thus, remarkable increase of pH was observed. Vigorous bubbling was observed until the addition of 200 g of zeolite. At the addition of 400 g of zeolite, the dispersion thickend remarkably so that a magnetic stirrer stopped. After this, stirring was conducted by a stirrer with a mortar. After standing one day, the viscosity of the zeolite dispersion was as high as more than 2,000 cp.

It is apparent that ion exchange procedure become easier with the use of a buffer.

What is claimed is:

1. Stabilized fluid Synthetic zeolite, characterized in that a pH of dispersion water of a synthetic zeolite dispersion is in a range of from 5 to 7, where synthetic zeolite is dispersed in distilled water at a concentration of 50 g/liter and maintained at a temperature of 20° to 25° C. for 24 hours, and that the synthetic zeolite shows an angle of response of 40 degrees or less.

2. The synthetic zeolite as claimed in claim 1, wherein the zeolite has almost constant ratios among Na, Al and O along the direction from the surface to the center of the zeolite particle.

3. The synthetic zeolite as claimed in claim 1, wherein the pH is in a range of from 6.0 to 6.8.

4. The synthetic zeolite as claimed in claim 1, wherein the angle of response is 30 degrees or less.

5. A process to prepare stabilized fluid synthetic zeolite, characterized in that synthetic zeolite is soaked in a buffered acid aqueous liquid; buffered or non-buffered acid is replenished, if needed, to maintain the pH of the soaking liquid at a value of about 7 or less and the soaking is continued until the pH remains approximately constant for at least 0.5 hour without replenishing the acid; and then the synthetic zeolite is heat-dried without being washed or after washed in conditions that the pH of a washing liquid does not substantially exceed about 6.5.

6. The process as claimed in claim 5, wherein the pH of the buffered soaking liquid is maintained in a range of from 4.0 to 6.5.

7. The process as claimed in claim 5, wherein the synthetic zeolite is washed with an acid aqueous liquid of a pH of 6.5 or less or a small amount of water between the soaking and the drying.

8. The process as claimed in claim 5, wherein weak acid is used in the buffered soaking liquid.

9. The process as claimed in claim 5, wherein the buffered soaking liquid contains weak acid and a salt of said weak acid.

10. The process as claimed in claim 5, wherein the soaking liquid contains a gel-forming substance.

11. The process as claimed in claim 10, wherein the gel-forming substance is selected from the group consisting of aluminosilicate, silicic acid, silicate, aluminate, alumina, natural semipermeable high molecular weight substances such as gelatin, agar, sodium allginate and cellulose derivatives, and semipermeable synthetic polymers such as PVA derivatives, regenerated cellulose derivatives, acrylic acid derivatives, melamine resin derivatives and phenol resin derivatives.

12. The process as claimed in claim 10, wherein the amount of the gel-forming substance is 0.01 to 1% by weight based on the whole synthetic zeolite.

13. A process of ion-exchanging synthetic zeolite with metal ions, characterized in that the synthetic zeolite is washed with a buffered aqueous acid liquid prior to the ion exchange.

14. The process as claimed in claim 13, wherein the synthetic zeolite is washed by dispersing the synthetic zeolite in said acid aqueous liquid while maintaining the pH of the dispersion in a range of 4.5 to 6.5.

15. The process as claimed in claim 13, wherein the acid aqueous liquid contains weak acid.

16. The process as claimed in claim 13, wherein the metal ion is silver ion.

17. The process as claimed in claim 13, wherein the synthetic zeolite is dried after the washing and then ion exchanged by absorbing such a small amount of a metal ion solution that is absorbed substantially to exhaustion.

18. The process as claimed in claim 13, wherein the ion-exchange is conducted by dispersing the synthetic zeolite in a metal ion solution whose pH is regulated in a range of 4.0 to 6.5 using weak acid.

19. The process as claimed in claim 18, wherein the metal ion is selected from the group consisting of silver, copper and zinc ions.

* * * * *